(12) United States Patent
Hallowell et al.

(10) Patent No.: US 10,648,739 B2
(45) Date of Patent: *May 12, 2020

(54) CONTROLLER WITH CLINKER AGITATOR CONTROL FOR BIOFUEL-FIRED FURNACE

(71) Applicant: Biomass Controls, LLC, Putnam, CT (US)

(72) Inventors: Jeffrey R. Hallowell, Woodstock, CT (US); Jessica M. Peterson, Woodstock, CT (US); Kelli A. O'Brien, Putnam, CT (US)

(73) Assignees: Jeffrey R. Hallowell, Woodstock, CT (US); Biomass Controls PBC, Putnam, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,257

(22) Filed: Nov. 5, 2018

(65) Prior Publication Data

US 2019/0072330 A1 Mar. 7, 2019

Related U.S. Application Data

(63) Continuation of application No. 14/485,719, filed on Sep. 13, 2014, now Pat. No. 10,139,166.

(Continued)

(51) Int. Cl.
*F23B 60/02* (2006.01)
*F23G 5/50* (2006.01)

(Continued)

(52) U.S. Cl.
CPC .............. *F27D 19/00* (2013.01); *F23G 7/10* (2013.01); *F23N 1/042* (2013.01); *F23N 5/003* (2013.01);

(Continued)

(58) Field of Classification Search
CPC .............. G05B 13/028; G05B 19/4183; G05B 19/4184
See application file for complete search history.

(56) References Cited

U.S. PATENT DOCUMENTS 3,847,562 A * 11/1974 Hamilton .................. C10J 3/34
48/76
4,177,740 A * 12/1979 Lamb ........................ F23N 3/00
110/213

(Continued)

FOREIGN PATENT DOCUMENTS

EP 0529368 12/1998
EP 2039995 3/2009

(Continued)

OTHER PUBLICATIONS

Fordscorpio.co.uk, "Catalytic Converter," 3 pages, Aug. 3, 2005, http://www.fordscorpio.co.uk/cats.htm.

(Continued)

*Primary Examiner* — Michael Roswell
(74) *Attorney, Agent, or Firm* — Sunstein LLP

(57) ABSTRACT

A microprocessor-based controller manages combustion within a biofuel furnace. A clinker agitator controller generates signals for controlling operation of a motorized clinker agitator of the biofuel furnace. The microprocessor-based controller may additionally control any of fuel feed rate, air supply rate and ash removal rate.

27 Claims, 11 Drawing Sheets

Related U.S. Application Data

(60) Provisional application No. 61/877,663, filed on Sep. 13, 2013.

(51) Int. Cl.

| | |
|---|---|
| *F27D 19/00* | (2006.01) |
| *F23N 1/04* | (2006.01) |
| *F23N 5/02* | (2006.01) |
| *F23G 7/10* | (2006.01) |
| *F23N 5/00* | (2006.01) |
| *F23N 5/18* | (2006.01) |
| *F23N 5/26* | (2006.01) |
| *G05B 15/02* | (2006.01) |
| *G05D 7/06* | (2006.01) |

(52) U.S. Cl.
CPC ............ *F23N 5/022* (2013.01); *F23N 5/18* (2013.01); *F23N 5/265* (2013.01); *G05B 15/02* (2013.01); *G05D 7/0617* (2013.01); *F23G 2207/101* (2013.01); *F23G 2207/20* (2013.01); *F23G 2207/30* (2013.01); *F23G 2209/26* (2013.01); *F23N 2025/08* (2013.01)

(56) References Cited

U.S. PATENT DOCUMENTS

| | | | | |
|---|---|---|---|---|
| 4,311,102 | A * | 1/1982 | Kolze | F23G 5/444 |
| | | | | 110/101 C |
| 4,363,785 | A | 12/1982 | Willson | |
| 4,392,813 | A * | 7/1983 | Tanaka | F23N 5/006 |
| | | | | 431/201 |
| 4,417,558 | A * | 11/1983 | Osuga | F02D 35/0092 |
| | | | | 123/482 |
| 4,495,873 | A | 1/1985 | Blankenship | |
| 4,582,044 | A | 4/1986 | Ferguson et al. | |
| 4,707,241 | A * | 11/1987 | Nakagawa | G01N 27/4065 |
| | | | | 123/693 |
| 4,749,112 | A * | 6/1988 | Harper | A47G 23/0225 |
| | | | | 224/553 |
| 4,749,122 | A | 6/1988 | Shriver et al. | |
| 5,497,617 | A | 3/1996 | Bagley et al. | |
| 5,499,622 | A | 3/1996 | Woods | |
| 5,822,978 | A | 10/1998 | Streit et al. | |
| 6,055,915 | A * | 5/2000 | Bickell | F23G 5/50 |
| | | | | 110/101 CA |
| 6,237,587 | B1 | 5/2001 | Sparling et al. | |
| 7,628,137 | B1 * | 12/2009 | McAlister | F02M 21/026 |
| | | | | 123/297 |
| 7,739,966 | B2 * | 6/2010 | Ingvarsson | F23B 50/12 |
| | | | | 110/165 R |
| 7,878,300 | B2 | 2/2011 | Sammut et al. | |
| 7,909,899 | B2 * | 3/2011 | Diebold | B01D 29/27 |
| | | | | 423/650 |
| 8,210,110 | B2 * | 7/2012 | Nelson | F23B 1/16 |
| | | | | 110/218 |
| 8,646,441 | B2 | 2/2014 | Haas et al. | |
| 8,798,796 | B2 * | 8/2014 | Grohman | G05D 27/02 |
| | | | | 700/276 |
| 8,812,162 | B2 | 8/2014 | Schneider et al. | |
| 8,857,186 | B2 | 10/2014 | Held | |
| 2001/0029004 | A1 | 10/2001 | Sparling et al. | |
| 2005/0112043 | A1 | 5/2005 | Sparling et al. | |
| 2006/0157047 | A1 | 7/2006 | Tiegs | |
| 2007/0084942 | A1 * | 4/2007 | Moore | F02G 1/043 |
| | | | | 237/19 |
| 2007/0114296 | A1 | 5/2007 | Walborn | |
| 2008/0039975 | A1 | 2/2008 | Haga et al. | |
| 2009/0050129 | A1 | 2/2009 | Robinson, Jr. | |
| 2011/0008214 | A1 | 1/2011 | Haas et al. | |
| 2011/0247533 | A1 | 10/2011 | Haas et al. | |
| 2011/0300494 | A1 | 12/2011 | Masen et al. | |
| 2012/0048158 | A1 | 3/2012 | Grace et al. | |
| 2012/0116589 | A1 | 5/2012 | Schneider et al. | |

FOREIGN PATENT DOCUMENTS

| | | |
|---|---|---|
| FR | 2939870 | 6/2010 |
| WO | WO 00/08390 | 2/2000 |
| WO | WO 2009/144393 | 12/2009 |
| WO | WO 2010/075580 | 7/2010 |

OTHER PUBLICATIONS

Custom Fireplaces & More, "Catalytic or Non-Catalytic?," 5 pages, 2010, http://www.customfireplacesandmore.com/40/catalytic-non-catalytic.html.

SHT Heiztechnik aus Salzburg "Fully Automatic Combi-Boiler for Wood-Pellets and Logwood 4, 5-25, kW," 8 pages, 2006, www.sht.at/fileadmin/user_upload/TDA_Prospekt-ENG_F10-1 .pdf.

International Searching Authority, Invitation to Pay Additional Fees and, Where Applicable, Protest Fee for International Application No. PCT/US2011/059480 dated Apr. 26, 2013, 8 pages.

International Searching Authority, International Search Report—International Application No. PCT/US2011/059480, dated Aug. 16, 2013, together with the Written Opinion of the International Searching Authority, 17 pages.

International Bureau of WIPO, Notification Concerning Transmittal of International Preliminary Report on Patentability, Application No. PCT/US2011/059480, dated Aug. 21, 2013, 11 pages.

International Searching Authority, International Search Report, International Application No. PCT/US2014/055541, dated Dec. 9, 2014, together with the Written Opinion of the International Searching Authority, 11 pages.

"100 Years of Programmable Thermostats," http://www.prothermostats.com;hsitory, php. Accessed Aug. 30, 2017, 3 pages.

* cited by examiner

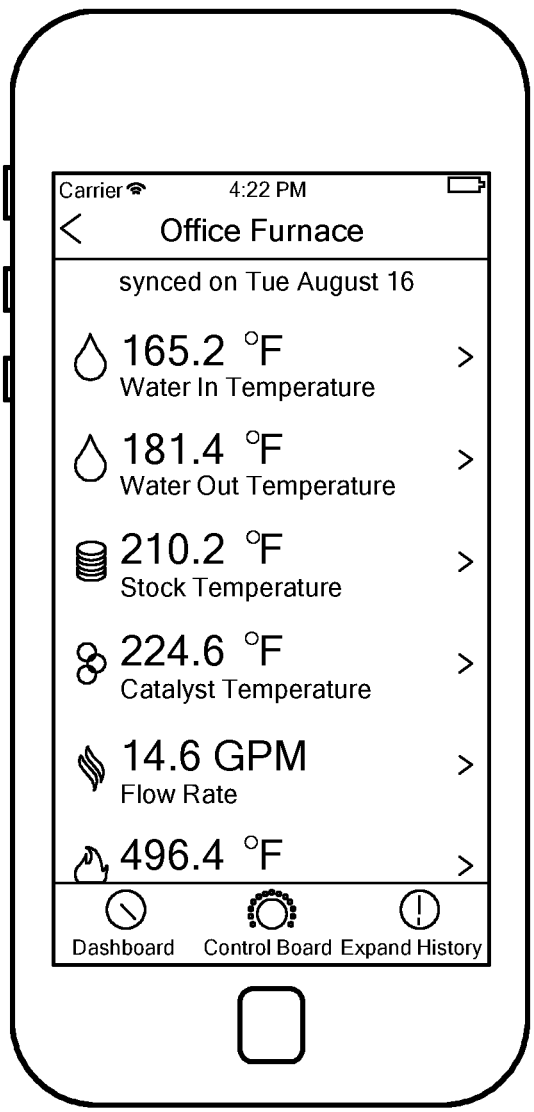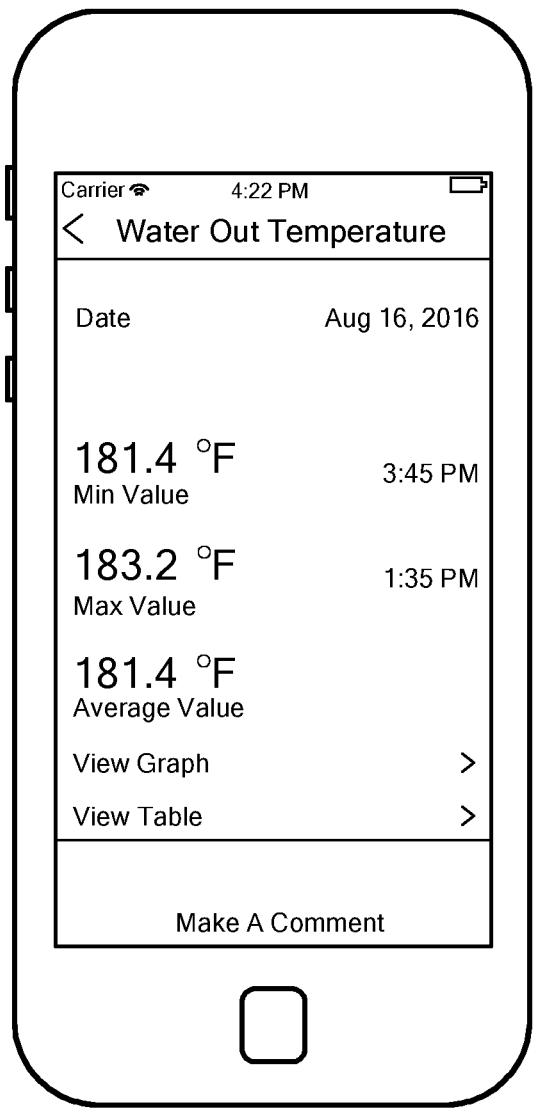
*FIG. 11*          *FIG. 12*

CONTROLLER WITH CLINKER AGITATOR CONTROL FOR BIOFUEL-FIRED FURNACE

CROSS REFERENCE TO RELATED APPLICATIONS

This application is a continuation of U.S. application Ser. No. 14/485,719, filed Sep. 13, 2014, titled "Fuel Feed and Air Feed Controller for Biofuel-Fired Furnace," which claims the benefit of U.S. Provisional Patent Application No. 61/877,663, filed Sep. 13, 2013, titled "Fuel Feed and Air Feed Controller for Biofuel-Fired Boiler," the entire contents of which applications are hereby incorporated by reference herein, for all purposes.

TECHNICAL FIELD

The present invention relates to controllers for biofuel-fired devices and, more particularly, to such controllers that regulate fuel feeders, air feeders and/or ash removers according to thermal and fuel/air algorithms to improve combustion and thermal efficiency.

BACKGROUND ART

United States Environmental Protection Agency (EPA) regulations limit the amount of particulate matter, measured in grams per hour, that may be emitted by biomass-fired heating devices, such as stoves, furnaces, boilers, kilns, roasters and other devices that are fueled by stick wood, wood pellets, grass pellets, wood chips or other bio-solids. Particulate matter is typically produced due to incomplete combustion of fuel. There is, therefore, a need to improve combustion efficiency and thermal efficiency. Such improvements in efficiency typically lead to decreases in the amount of particulate matter produced per unit of heat generated and increase the amount of heat generated per unit of fuel consumed.

SUMMARY OF EMBODIMENTS

An embodiment of the present invention provides a controller system for a biofuel-fired furnace. The system includes a fuel feed controller connectable to a motorized fuel feed device of the biofuel furnace. The fuel feed controller is configured to generate first signals for controlling operation of the fuel feed device. The system also includes a supply air controller connectable to a supply air handler of the biofuel furnace. The supply air controller is configured to generate second signals for controlling operation of the supply air handler. The system also includes a heat demand calculator. The heat demand calculator is connectable to a sensor coupled to the biofuel furnace, so as to repeatedly receive signals from the sensor. The heat demand calculator is configured to repeatedly calculate, based at least in part on the signals from the sensor, a current thermal demand placed on the biofuel furnace. The system also includes a heat production adjuster coupled to the heat demand calculator, to the fuel feed controller and to the supply air controller. The heat production adjuster is configured to repeatedly monitor the thermal demand placed on the biofuel furnace. The heat production adjuster is also configured to repeatedly recalculate a rate at which the fuel feed device should deliver fuel to the biofuel furnace, based at least in part on a current thermal demand. The heat production adjuster is also configured to repeatedly recalculate a rate at which the supply air handler should deliver air to the biofuel furnace. The heat production adjuster is also configured to cause the fuel feed controller and the supply air controller to operate the fuel feed device and the supply air handler, respectively, according to the recalculated rates.

The heat production adjuster may be further configured to repeatedly adjust the rates at which the fuel feed device and the supply air handler deliver the fuel and the air, respectively, to the biofuel furnace, so as to deliver the fuel and the air at a ratio within a predetermined range.

The heat production adjuster may be further configured to alter the fuel to air ratio, based at least in part on at least one of moisture content of the fuel, geometry of the fuel and density of the fuel.

The heat production adjuster may be further configured to repeatedly recalculate the rate at which the supply air handler should deliver the air to the biofuel furnace, based at least in part on the current thermal demand.

The heat production adjuster may be further configured to repeatedly recalculate the rate at which the supply air handler should deliver the air to the biofuel furnace based, on at least in part on the rate fuel should be delivered to the biofuel furnace.

The heat demand calculator may be further further configured to repeatedly calculate a rate of change of the thermal demand placed on the biofuel furnace. The heat production adjuster may be further further configured to repeatedly recalculate the rate at which the fuel feed device should deliver the fuel to the biofuel furnace, based at least in part on the rate of change of the thermal demand.

The sensor may include a temperature sensor.

The temperature sensor may be further configured to repeatedly measure an inlet temperature and an outlet temperature of a fluid circulated through, and thereby heated by, the biofuel furnace. The heat demand calculator may be further configured to repeatedly calculate the current thermal demand placed on the biofuel furnace based at least in part on a difference (delta T) between the outlet temperature and the inlet temperature.

The sensor further may further include a flow rate sensor configured to repeatedly measure flow rate of the fluid. The heat demand calculator may be configured to repeatedly calculate the current thermal demand placed on the biofuel furnace based at least in part on signals from the flow rate sensor.

The heat production adjuster may be further further configured to repeatedly monitor temperature of the fluid and repeatedly recalculate the rate at which the fuel feed device should deliver the fuel to the biofuel furnace, so as to prevent the temperature of the fluid exceeding a predetermined value.

The heat production adjuster may be further further configured to repeatedly monitor temperature of the fluid and repeatedly recalculate the rate at which the fuel feed device should deliver the fuel to the biofuel furnace, so as to prevent the temperature of the fluid becoming less than a predetermined value.

The sensor may include a fluid flow rate sensor configured to repeatedly measure flow rate of a fluid circulated through, and thereby heated by, the biofuel furnace.

The sensor may include a temperature sensor configured to measure temperature of the fluid.

The system may also include an ash removal controller connectable to a motorized ash removal device of the biofuel furnace and configured to generate third signals for controlling operation of the ash removal device. The heat production adjuster may be coupled to the ash removal controller and may be further configured to repeatedly recalculate a rate at which the ash removal device should remove ash from the biofuel furnace and cause the ash removal controller to operate the ash removal device according to the recalculated rate.

The heat production adjuster may be further configured to repeatedly recalculate the rate at which the ash removal device should remove the ash from the biofuel furnace, such that a ratio of the ash removal rate to the fuel feed delivery rate remains substantially constant.

The constant may be a value based on a type of fuel being delivered to the biofuel furnace.

The heat production adjuster may be further configured to repeatedly recalculate the rate at which the ash removal device should remove the ash from the biofuel furnace, such that operation of the ash removal device lags behind operation of the fuel feed delivery device by a predetermined amount of time.

The predetermined amount of time may be based on a type of fuel being delivered to the biofuel furnace.

The system may also include a clinker agitator controller connectable to a motorized clinker agitator of the biofuel furnace and configured to generate fourth signals for controlling operation of the clinker agitator. The heat production adjuster may be coupled to the clinker agitator controller and may be further configured to repeatedly recalculate times at which to operate the clinker agitator and to cause the clinker agitator controller to operate the clinker agitator, according to the recalculated times.

The system may include an oxygen level calculator connectable to an oxygen sensor coupled to the biofuel furnace, so as to repeatedly receive signals from the oxygen sensor. The oxygen level calculator may be configured to repeatedly calculate, based on the signals from the oxygen sensor, a current oxygen level within the biofuel furnace. The heat production adjuster may be coupled to the oxygen level calculator and may be configured to repeatedly monitor the oxygen level within the biofuel furnace and repeatedly recalculate the rate at which the fuel feed device should deliver fuel to the biofuel furnace, based at least in part on a current oxygen level.

The heat production adjuster may be further configured to cause the fuel feed controller and the supply air controller to operate the fuel feed device and the supply air handler, respectively, so as to deliver air to the biofuel-fired furnace for a predetermined amount of time prior to beginning delivery of fuel to the biofuel-fired furnace.

The heat production adjuster may be further configured to cause the fuel feed controller and the supply air controller to operate the fuel feed device and the supply air handler, respectively, so as to deliver air to the biofuel-fired furnace for a predetermined amount of time after ceasing delivery of fuel to the biofuel-fired furnace.

The heat production adjuster may be further configured to cause the fuel feed controller and the supply air controller to operate the fuel feed device and the supply air handler, respectively, so as to deliver air to the biofuel-fired furnace after ceasing delivery of fuel to the biofuel-fired furnace until the a current oxygen level reaches a predetermined value.

The system may also include a weather prediction data receiver. The heat production adjuster may be coupled to the weather prediction data receiver and configured to repeatedly recalculate the rate at which the fuel feed device should deliver the fuel to the biofuel furnace, based at least in part on data received from the weather prediction data receiver.

BRIEF DESCRIPTION OF THE DRAWINGS

The invention will be more fully understood by referring to the following Detailed Description of Specific Embodiments in conjunction with the Drawings, of which:

FIGS. 11 and 12 show exemplary user interfaces of an application program executed by a mobile telephone, according to embodiments of the present invention.

DETAILED DESCRIPTION OF SPECIFIC EMBODIMENTS

Figure 1:
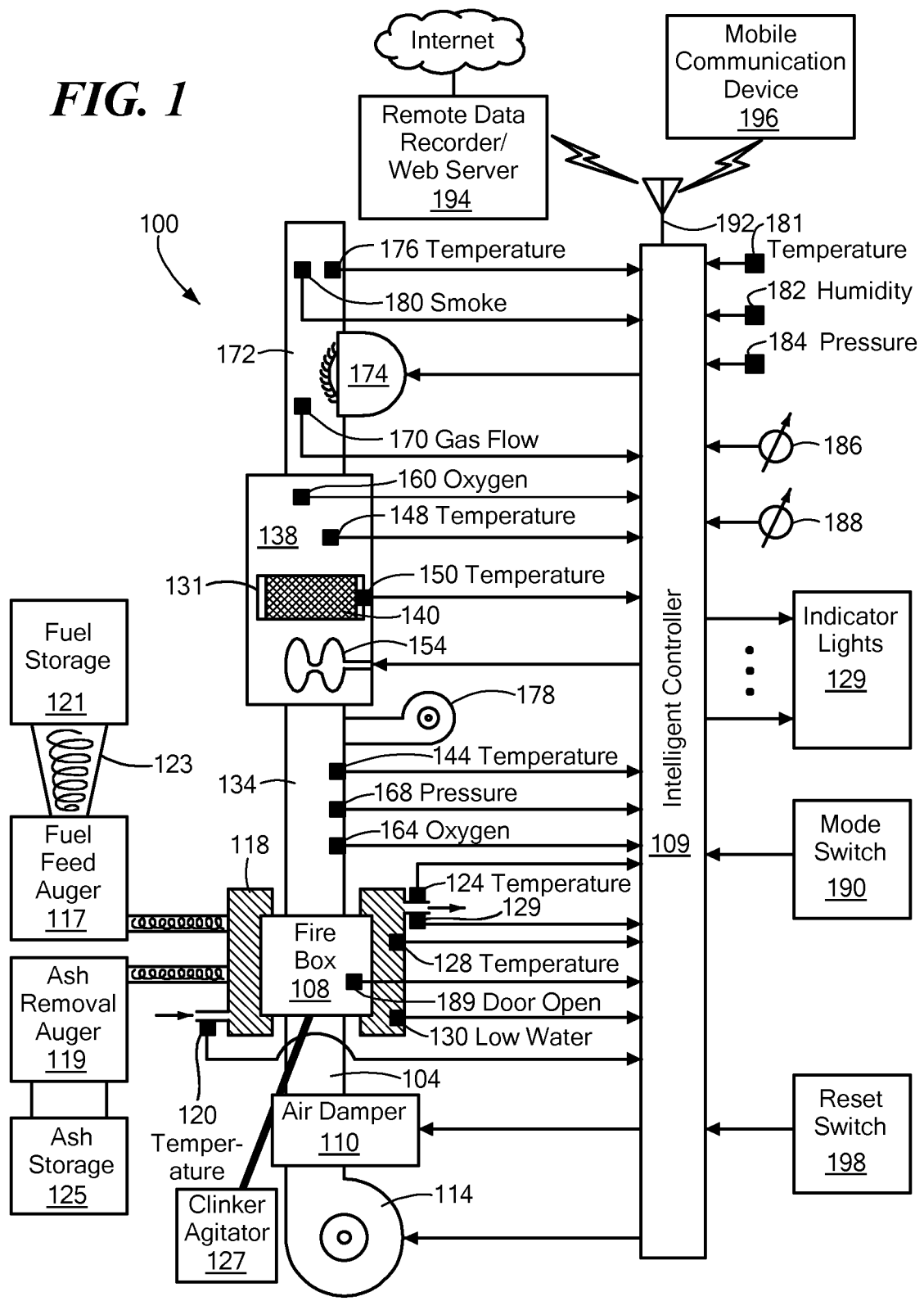
FIG. 1 is a schematic block diagram of a bio-fuel fired boiler, an intelligent bio-fuel controller (IBC) and a catalyst-based pollution control device (PCD) that is controlled by the IBC, according to an embodiment of the present invention.

Embodiments of the present invention provide controllers for biofuel-fired devices, such as wood furnaces, wood ovens, wood stoves, outdoor wood boilers (OWB) and the like. These controllers sense operating parameters of the biofuel-fired devices and, in response, control fuel feed mechanisms and/or air feed mechanisms supplying the devices and, in some embodiments, ash removal mechanisms, so as to improve operating efficiency over prior art biofuel-fired devices. The rate of fuel and air delivery may be modulated to meet a current thermal demand. If an increasing thermal demand is anticipated, such as domestic heat in the morning when occupants awake, the rate of fuel and air delivery may be modulated to exceed a current thermal demand. Similarly, if a decreasing thermal demand is anticipated, such as at bedtime or in warm climates to prevent furnace cycling, the rate of fuel and air delivery may be modulated so as to be less than a current thermal demand.

The sensed parameters may include: temperature, oxygen level, pressure, rate at which heat is extracted from a biofuel-fired device and/or rate at which heat is generated by the device. The temperature may include: air intake temperature, stack temperature and/or temperature within a firebox. The oxygen level may include oxygen level in the fire box and/or at a location within the stack upstream and/or downstream of a catalyst in the stack. The pressure may include flue pressure before (upstream) and/or after (downstream) of a pollution control device (PCD), such as a catalytic converter.

The rate at which heat is extracted from the device may be calculated by measuring or assuming a flow rate, flow time and/or temperature of water, air or another heat-transfer medium used to transfer heat from the device to a holding tank, a dwelling or other space, or the like. In some embodiments, a first temperature (an "input temperature") of the heat-transfer medium is measured as the medium enters the biofuel-fired device and a second temperature (an "output temperature") of the medium is measured as the medium leaves the device, and a difference (delta T) between the first temperature and the second temperature may be calculated. In some embodiments, thermal loss from a device is calculated or estimated from measured temperatures of surfaces of the device and/or measured temperature of vented gases.

Bio-fuel here means a fuel that is in some way derived from biomass, including bio-solids, human waste, liquid fuels and bio-gases. Biomass, a renewable energy source, is biological material from living, or recently living, organisms, such as wood, waste, algae, (hydrogen) gas and alcohol fuels. Exemplary solid biofuels include wood and wood pellets. Bioethanol is an alcohol made by fermenting sugar components of plant materials; it is made mostly from sugar and starch crops. Some embodiments of the present invention may be used with conventional fossil fuels, such as coal, oil or oil-derived fuels. Thus, where appropriate, the term bio-fuel includes fossil fuels.

In embodiments of the present invention, a controller inputs measurements from a biofuel-fired device and, based on these measurements, generates signals that control mechanical devices that supply fuel and/or air to the biofuel-fired device and, optionally, remove ash.

Wood furnaces are known as good sources of heated water, without depending on foreign sources of fuel and without burning fossil fuel. However, as noted, particulate matter and harmful gases such as carbon monoxide produced by wood-burning devices pose problems, and manually-operated catalytic converters are inadequate to solve these problems.

We have found that maintaining certain operating parameters within certain ranges causes fuel to be burned efficiently, thereby providing a high rate of useful energy extraction from the fuel and a low rate of particulate emission. We have found that, for bio-solid fuel, as well as wood fuel, maintaining an "excess oxygen" level between about 2% and about 4% causes the fuel to burn efficiently, although some fuels require lower levels of oxygen to produce biochar or charcoal. "Excess oxygen" is described in more detail below. Embodiments of the present invention influence excess oxygen levels by modulating fuel fed and/or by modulating air fed to a biofuel-fired device. Feeding more air into the device, or feeding the air into the device at a higher rate, increases the excess oxygen level, whereas feeding less air, or feeding it at a lower rate, decreases excess oxygen. Conversely, feeding more fuel, or feeding the fuel at a higher rate, into the device causes a fire to consume oxygen at a higher rate, thereby decreasing excess oxygen. Feeding less fuel, or feeding the fuel at a lower rate, causes the fire the consume oxygen at a lower rate, thereby effectively increasing excess oxygen.

The controller may determine the amount of excess oxygen available within the biofuel-burning device by directly measuring it via one or more sensor, or the amount of excess oxygen may be estimated or calculated from one or more values provided by one or more sensors, such as oxygen sensors. These sensors may be attached to the biofuel-fired device, such as to measure oxygen levels in the stack (before and/or after a PCD), in a firebox or elsewhere.

As noted, the air feed rate may be controlled by automatically modulating an air feed mechanism, such as a blower and/or a damper. For example, speed of an electric motor driving a blower may be adjusted by the controller. Operating the blower at a relatively high speed introduces more air, and therefore more oxygen, into the fire than operating the blower at a relatively lower speed. The speed of the motor may be controlled by adjusting voltage of electricity supplied to the motor. Optionally or alternatively, frequency and/or phase of the electricity may be adjusted by the controller. Similarly, opening or closing a damper allows relatively more or less air into the fire. An extent to which a damper is open may be set by the controller. For example, a stepper motor or continuously variable servo motor may be operated by the controller to set the damper's opening.

Increasing a rate of fuel feed increases an amount of fuel in a fire, thereby increasing demand for oxygen and therefore decreasing the amount of excess oxygen. Conversely, decreasing the rate of fuel feed, or ceasing feeding fuel, decreases the amount of fuel in the fire, thereby decreasing demand for oxygen and therefore increasing the amount of excess oxygen. The fuel, such as wood pellets, may be fed into the device by an auger or another motor-operated feed mechanism. Speed of the auger or other feed mechanism is proportional to rate at which fuel is fed into the fire. The controller in some embodiments is configured to set the speed of the auger or other feed mechanism motor, or to cease operation of the motor. Thus, the controller may regulate the rate at which fuel is fed into the fire. Likewise, ash may be removed by a variable speed motorized auger.

A biofuel-fired device typically generates ash or clinkers, as a result of burning the biofuel. Excessive ash or clinker build-up within such a device can cause problems. In some embodiments, the controller regulates speed and/or on-off operation of an ash removal auger, clinker agitator and/or other mechanism motor. The controller calculates or estimates a rate at which ash builds up and/or an amount of built-up ash, based at least in part on a rate and/or amount of fuel that has been fed into the device and, optionally, including a rate or amount of air that has been introduced into the device. When the calculated or estimated amount of ash exceeds a predetermined value, the controller may operate the ash removal motor. In some embodiments, the ash removal motor operates continuously or semi-continuously, and the controller regulates the speed of the motor.

If the ash removal motor is operated too aggressively, all the ash and some fuel and/or glowing embers may be removed from the device, which could extinguish the fire or make it difficult for newly added fuel to begin burning, particularly in a low-burn, idle or standby state. The controller is configured to operate the ash removal motor, so as to remove excess ash, without removing fuel. In some embodiments, the ash removal motor is operated, such that ash accounts for about 1% of the solid (fuel and ash) material within the device.

Fuel requires oxygen to burn. The oxygen is typically provided by air fed into a device. The amount of air, per unit (such as pound or kilogram or cubic foot or cubic meter) of fuel, required for combustion varies, depending on the type of the fuel. Similarly, the optimum ratio of air to fuel varies by fuel type. In general, fuel that has a relatively high ratio of surface area to weight requires relatively more air. For example, "stick" wood, i.e., unprocessed or simply split branches from trees, requires a ratio of about 10:1 to about 12:1 (air to wood, by weight), whereas wood pellets require a ratio of about 32:1 to about 35:1 (air to wood, by weight).

Prior art systems tend to supply more air than is needed to maintain an about 2-4% excess oxygen level. Prior art systems supply more air than is needed, because they cannot measure, regulate or calculate the excess oxygen level and/or were not designed with an intention to maintain some predetermined excess oxygen level, and were sometimes designed to dilute exhaust gas with air.

Controllers, according to some embodiments, are configured according to the type of fuel is to be burned. These controllers include the fuel type, and therefore an appropriate air-to-fuel ratio, in their calculations, such as calculations to determine a desired excess oxygen level and to determine whether and/or at what speed to operate a blower motor, fuel feed motor and/or ash removal motor. Some embodiments modulate air provided to a fire, based on temperature measurements.

Some fuels, such as fuels that include sand or sugars, may produce "clinkers" as a result of melting or sintering, if the fuels are burned at a sufficiently high temperature. For example, corn and grasses are known to produce clinkers. In some embodiments, the controller operates the air and/or fuel feed motors so as to maintain a fire temperature low enough to reduce or avoid clinker production, if the fuel is known to produce clinkers. Some embodiments include a clinker agitator to break up clinkers, so they are extracted along with ash.

In some embodiments, the controller receives data from oxygen and/or temperature sensors and calculates or estimates an amount of excess oxygen available or desirable for an efficient burning of the fuel and, based on the calculation or estimation, operates air feed, fuel feed and/or ash removal motors, so as to achieve to approach the desired excess oxygen level. However, an amount of air introduced into the device for efficient combustion of fuel may cause an undesirable amount of heat to be exhausted via the flue ("stack loss"). That is, although the fuel may be burned efficiently, thereby producing a relatively small amount of particulate matter, the efficiency with which heat is captured from the burning fuel and put to a productive use may be relatively low. We refer to this as "thermal loss."

In some embodiments, the controller measures temperature of exhaust gas in the flue. The exhaust gas should have a temperature greater than about 212° F. (optionally, adjusted for atmospheric pressure and dew point), so as to prevent condensation of water within the device. The controller may increase or decrease, as necessary, the amount of air fed into the device to maintain a desired stack temperature. We have found that an exhaust temperature in a range between about 220° F. and about 230° F. is desirable. However, in condensing boilers or systems that include "wet scrubbers," the exhaust gas may be somewhat cooler, such as about 130° F.

In some embodiments, the controller measures ambient temperature, which is likely equal to temperature of air being introduced into the device. The greater the difference between the exhaust temperature and the intake (or ambient) temperature (delta T-device), the less thermally efficient the device is operating. However, to prevent condensation, the stack temperature, and therefore the delta T-device, may need to be high, despite the resulting thermal inefficiency. The controller may compensate for low thermal efficiency by adding more fuel or adding fuel at a higher rate than it would otherwise do.

High fire temperatures, above about 1,600° F., can lead to NOx production, which is undesirable. In some embodiments, the controller monitors fire and/or flue temperature and regulates air and/or fuel feed, so as to maintain fire temperatures low enough to reduce or avoid NOx production.

Embodiments of the disclosed intelligent controller for a biofuel furnace automatically monitor various operating parameters, such as catalytic converter input temperature, catalytic converter output temperature, pre-catalyst oxygen level, post-catalyst oxygen level, ambient temperature, ambient humidity, ambient barometric air pressure, water jacket temperature, water jacket inlet temperature and water jacket outlet temperature, of bio-fuel fired devices and automatically control electric heaters, dampers, blowers, fuel feed augers, ash removal augers or other components in the devices. As a result, the devices operate more cleanly and efficiently than prior art bio-fuel fired devices.

A controller 109, as shown in FIG. 1, includes a processor executing instructions stored in a memory. The controller 109 receives data, such as stack temperature, from sensors, such as sensor 176. The controller 109 controls air feed mechanisms, such as blower 114 and/or damper 110, to control amount or rate at which air is fed into the firebox 108. Similarly, the controller 109 controls fuel feed mechanisms, such as a fuel feed auger 117, and ash removal mechanisms, such as ash removal auger 119. In some configurations, the fuel feed auger 117 is supplied from a fuel storage bin 121 by a transport auger 123. The ash removal auger 119 may deposit ash into an ash storage bin 125. The fuel feed auger 117, the ash removal auger 119 and the fuel transport auger 123 may be driven by suitable variable speed motors. A clinker agitator motor 127 may be mechanically coupled to a clinker agitator (not visible) in the firebox 108.

Various sensors measure operating parameters of the biofuel fired device 100. For example, an inlet temperature sensor 120 and an outlet temperature sensor 124 may sense temperatures of air, water, glycol, a mixture thereof or another heat-transfer fluid flowing through a jacket 118 around the firebox 108. The sensors may be thermocouples, thermistors or any suitable electronic temperature sensors. The sensors may generate analog or digital signals. A flow rate sensor 129 senses a rate at which the fluid flows.

A difference between the inlet and the outlet temperatures, in conjunction with the flow rate and knowledge of the heat constant of the fluid, enables calculation of an amount of heat being extracted from the furnace 100. For example, the number of BTUs extracted by water may be calculated by multiplying the flow rate in gallons per minute (GPM) by the difference in temperature (delta T), times about 500. It should, however, be noted that as water temperature increases, the water becomes less dense, consequently its heat capacity per unit volume decreases, according to a known curve. The controller 109 may, if desired, compensate for this decreased heat capacity, according to the water's temperature. If the fluid is air, the number of BTUs may be calculated by multiplying the flow rate in cubic feet per minute (CFM) by delta T, times about 1.08.

Excess Oxygen

The following discussion is based largely on non-wood fuels. However, principles discussed here apply generally to wood fuels.

Stoichiometric or theoretical combustion is an ideal combustion process where fuel is burned completely. A complete combustion is a process that burns all incoming carbon (C) to (CO2), all incoming hydrogen (H) to (H2O) and all incoming sulfur (S) to (SO2). Resulting exhaust gas contains only products of complete combustion, i.e., CO2, $H_2O$ and SO2. If the exhaust gas includes unburned components, such as C, H2, CO, the combustion process is considered incomplete, not stoichiometric. The combustion process can be expressed as:

[C+H(fuel)]+[O2+N2(Air)]→(Combustion Process)→[CO2+H2O+N2(Heat)]

where:
C=Carbon
H=Hydrogen
O=Oxygen
N=Nitrogen

The stoichiometric air-fuel ratio may be used to ascertain a proper ratio of fuel and air to feed into a furnace to achieve efficient combustion. However, prior art process heating equipment is rarely run stoichiometrically. "On-ratio" combustion used in boilers and high temperature process furnaces usually incorporates a modest amount of excess air, about 10-20% more than what is needed to burn the fuel completely.

If an insufficient amount of air is supplied to the burner, unburned fuel, soot, smoke, and carbon monoxide exhausts from the boiler, resulting in heat transfer, surface fouling, pollution, lower combustion efficiency, flame instability and a potential for explosion.

To avoid inefficient and unsafe conditions, boilers normally operate with an excess air level. This excess air level also provides protection from insufficient oxygen conditions caused by variations in fuel composition and "bridging" in the fuel-air control system. Typical values of excess air are indicated for various fuels in Table 1, below. If air content is higher than the stoichiometric ratio, the mixture is said to be fuel-lean. If air content is less than the stoichiometric ratio, the mixture is fuel-rich. Each fuel type has its own recommended excess air level.

An example of stoichiometric combustion of methane (CH4) follows. The most common oxidizer is air. The chemical equation for stoichiometric combustion of methane (CH4) with air can be expressed as:

CH4+2(O2+3.76N2)→CO2+2H2O+7.52N2

If more air is supplied, some of the air will not be involved in the reaction. The additional air is termed excess air, but the term theoretical air may also be used. 200% theoretical air is 100% excess air. The chemical equation for methane burned with 25% excess air can be expressed as:

CH4+1.25×2(O2+3.76N2)→CO2+2H2O+0.5O2+ 9.4N2

Approximate values for CO2 and O2 in flue gas as a result of excess air are estimated for various fuels in Table 1, below.

TABLE 1

Carbon Dioxide in Flue Gas (% volume)

| Excess Air % | Natural Gas | Propane Butane | Fuel Oil | Bituminous Coal | Anthracite Coal | Oxygen in flue gas (% volume, all fuels) |
|---|---|---|---|---|---|---|
| 12 | 14 | 15.5 | 18 | 20 | 0 | |
| 10.5 | 12 | 13.5 | 15.5 | 16.5 | 3 | |
| 40 | 9 | 10 | 12 | 13.5 | 14 | 5 |
| 60 | 8 | 9 | 10 | 12 | 12.5 | 7.5 |
| 80 | 7 | 8 | 9 | 11 | 11.5 | 9 |
| 6 | 6 | 8 | 9.5 | 10 | 10 | |

Some embodiments of the present invention control damper(s) and/or fan(s), based on measured quantities, to operate bio-fuel fired device efficiently and/or to reduce generation of smoke or other pollutants. We found that properly controlling the amount of oxygen in a fire box causes bio-fuel to be burned relatively cleanly and relatively efficiently. We discovered that, once a fire is established, between about 3% and about 4% excess oxygen (i.e., oxygen in flue gas downstream from the catalytic converter) is optimal. We discovered that less than about 3% excess oxygen starves the fire of oxygen and produces large quantities of smoke as the fire dies out. On the other hand, we discovered that more than about 4% excess oxygen causes the fire to rage, which consumes fuel at a high rate and causes much of the heat generated by the fire to be exhausted out the flue, rather than being captured by a water jacket or other heat transfer mechanism. In other words, operating with too little excess oxygen is dirty, whereas operating at too high an excess oxygen level is inefficient, in term of heat capture. Different bio-fuel fired devices may have different optimum values of excess oxygen. These optimum values may be empirically determined.

Similarly, we have found that providing sufficient oxygen to a catalytic converter is important to effective operation of the catalytic converter. The amount of oxygen required by the catalytic converter varies depending on several factors, largely the amount of smoke to be combusted. We discovered that at least about 3-4% excess oxygen indicates that gases entering the catalytic converter have sufficient oxygen to support secondary combustion by the catalytic converter.

Some embodiments measure oxygen level at one or more locations within a bio-fuel device and control damper(s) and/or fan(s) to maintain the excess oxygen level within a predetermined range, such as about 3-4%. We found that oxygen levels of about 9-13% upstream of a catalytic converter usually lead to excess oxygen levels of about 3-4%.

Figure 6:
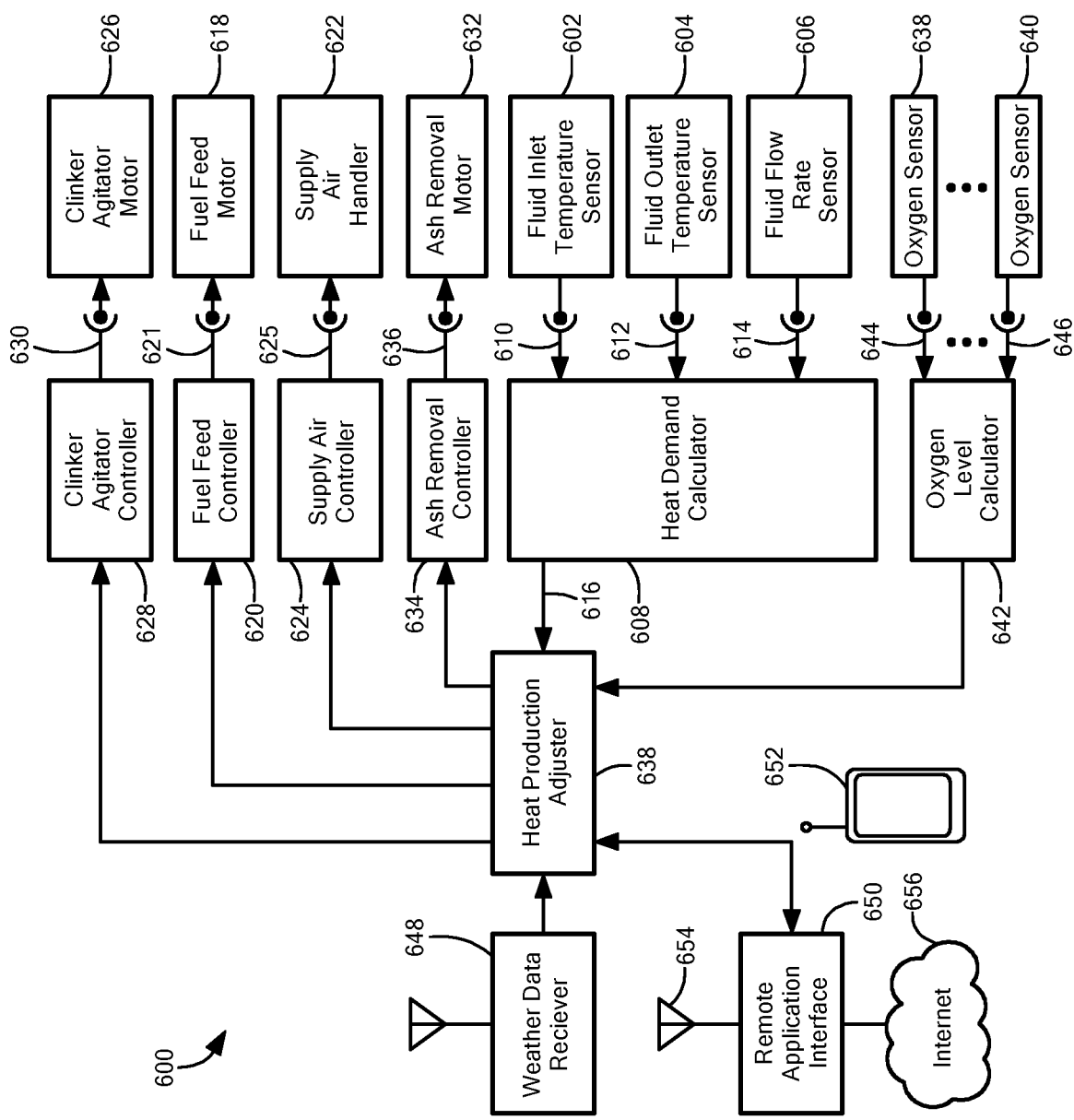
FIG. 6 is a schematic block diagram of a control system, according to an embodiment of the present invention.

Some embodiments of the present invention monitor heat demand on a biofuel furnace and automatically control fuel and air feed to the biofuel furnace so as to meet the heat demand, while burning the fuel efficiently. Some embodiments also automatically control ash extraction. FIG. 6 is a schematic block diagram of a control system 600, according to an embodiment of the present invention. A circulating fluid extracts heat from the furnace, as described herein. The amount of heat being extracted by the fluid may be considered the heat demand placed on the furnace.

A fluid inlet temperature sensor 602 measures temperature of the fluid as it enters the furnace, and a fluid outlet temperature sensor 604 measures the temperature of the fluid as it exits the furnace. A fluid flow rate sensor 606 measures a flow rate of the fluid. A heat demand calculator 608 is connectable to these sensors 602, 604 and 606. For example, the heat demand calculator 608 may include screw terminals or other types of connectors, by which the sensors 602, 604 and 606 may be electrically connected. The sensors 602, 604 and 606 generate signals 610, 612 and 614, respectively, which the heat demand calculator 608 receives. The heat demand calculator 608 repeatedly receives these signals, i.e., the heat demand calculator 608 continuously, periodically or occasionally samples these signals. Based on these signals, the heat demand calculator 608 repeatedly, i.e. continuously, periodically or occasionally, calculates a current thermal demand placed on the biofuel furnace.

As noted, the heat extracted by a circulating fluid may be calculated as a product of the temperature difference (delta T) between the inlet and outlet, the fluid's flow rate and a constant that depends on the type of fluid. If an automatic variable speed pump is used for circulating the fluid, and the speed of the pump is regulated so as to maintain a constant temperature difference (delta T) between the inlet and the outlet temperatures, then the heat demand calculator 608 needs only one temperature (inlet or outlet), in addition to the flow rate, to calculate the heat demand. If another system automatically regulates the temperature of the fluid, then the heat demand calculator 608 does not need a temperature sensor input, as long as it is configured with the temperature maintained by the other system. In any case, the heat demand calculator 608 outputs a signal 616 that represents the current heat demand placed on the furnace.

A variable speed motorized fuel feed motor 618 drives a fuel feed auger or other suitable fuel feed mechanism that delivers fuel to the biofuel-fired furnace. A fuel feed controller 620 is connectable to the fuel feed motor 618. The fuel feed controller 620 generates signals 621, such as a variable voltage, variable frequency, variable phase, a digital signal or any other suitable signal, that controls operation, including speed, on and off, of the fuel feed motor 618.

Similarly, a variable supply air handler 622 delivers air to the biofuel-fired furnace. The supply air handler 622 may include a variable speed blower, a variable damper or the like. A supply air controller 624 is connectable to the supply air handler 622. The supply air controller 624 generates signals 625, such as a variable voltage, variable frequency, variable phase, a digital signal or any other suitable signal that controls operation, including, as appropriate, speed, on, off, open, close, degree of openness, of the supply air handler 622.

Likewise, optionally, a clinker agitator 626 is mechanically coupled to the biofuel-fired furnace to break up clinkers. The clinker agitator 626 may include a fixed- or variable-speed motor, solenoid or other mechanical mover. A clinker agitator controller 628 is connectable to the clinker agitator 626. The clinker agitator controller 628 generates signals 630, such as a variable voltage, variable frequency, variable phase, a digital signal or any other suitable signal that controls operation, including, as appropriate, speed, on, off, pulse, of the clinker agitator 626.

Similarly, optionally, an ash removal motor 632 is mechanically coupled to an ash removal auger or other suitable mechanical ash removal mechanism. The ash removal motor 632 may include a fixed- or variable-speed motor, linear motor or other mechanical mover. An ash removal controller 634 is connectable to the ash removal motor 632. The ash removal controller 634 generates signals 636, such as a variable voltage, variable frequency, variable phase, a digital signal or any other suitable signal that controls operation, including, as appropriate, speed, on, off, pulse, of the ash removal motor 632.

A heat production adjuster 638 is coupled to the heat demand calculator 608 to receive the heat demand signal 616. In addition, the heat production adjuster 632 is coupled to the fuel feed controller 620 and to the supply air controller 624. If the system 100 includes a clinker agitator 626, and/or an ash removal motor 632, the heat production adjuster 638 is also coupled to the clinker agitator controller 628 and/or ash removal controller 634, as appropriate.

The heat production adjuster 638 repeatedly, i.e., continuously, periodically or occasionally, monitors the thermal demand signal 616, thereby monitoring the thermal demand placed on the biofuel furnace in real-time or near real-time. The heat production adjuster 638 repeatedly, i.e., continuously, periodically or occasionally, recalculates a rate at which the fuel feed motor 618 should deliver fuel to the biofuel furnace, based at least in part on a current thermal demand 616.

To perform this recalculation, the heat production adjuster 638 may use an expected number of BTUs released per unit volume of fuel. The heat production adjuster 638 may include a memory, in which is stored BTU per unit volume values for one or more types of fuel. The heat production adjuster 638 may use an expected volume of fuel delivered to the biofuel-fired furnace per unit of speed of the fuel feed motor 618. For example, given an auger thread pitch and depth, a fuel delivery rate per turn may be calculated, and the heat production adjuster 638 may be configured with this rate.

Optionally or alternatively, the heat production adjuster 638 may learn the fuel delivery rate per turn of the auger and/or a heat production rate per turn of the auger by recording the heat production over time, in relation to the fuel feed rate just prior to having delivered fuel to the furnace. The heat production adjuster 638 may use conventional statistical methods to automatically calculate or estimate a relationship between fuel delivery rate and heat production rate. This rate may vary with season and/or fuel type, and the heat production adjuster 638 may repeatedly adjust its calculated or estimated relationship over time to compensate for change of season, change of fuel type, deteriorated or improved condition of the furnace, etc.

The heat production adjuster 638 also repeatedly, i.e., continuously, periodically or occasionally, recalculates a rate at which the supply air handler 622 should deliver air to the biofuel furnace. The heat production adjuster 638 may recalculate the rate at which the supply air handler 622 should deliver air to the biofuel furnace, based at least in part on the current thermal demand 616. Optionally or alternatively, this rate may be a multiple of the rate at which fuel should be delivered, so as to maintain an air-to-fuel ratio with a predetermined range. The range may be a single value. The range may depend on the type of fuel being supplied. As noted, "stick" wood requires a ratio of about 10:1 to about 12:1 (air to wood, by weight), whereas wood pellets require a ratio of about 32:1 to about 35:1 (air to wood, by weight). Note that if the fuel feed rate is determined based at least in part on the current thermal demand, and the air feed rate is determined using a multiple of the fuel feed rate based on the desired air-to-fuel ratio, the air feed rate is essentially determined based at least in part on the current thermal demand.

The air-to-fuel ratio may be varied, based on several variables, including moisture content of the fuel, geometry of the fuel, density, surface area and type of fuel. High moisture fuels, such fuels having more than about 15% moisture, require more air, such as about 10% excess, to dehydrate the fuel before combustion. Often, after the dehydration stage, the amount of excess air may be reduced, and the fire can burn more efficiently. Larger fuel geometry and higher density fuels require less air-to-fuel, per pound, than smaller fuels and fuels having greater surface areas.

Optionally or additionally, the heat production adjuster 638 may repeatedly i.e., continuously, periodically or occasionally, recalculate a rate at which the ash removal motor 626 should remove ash from the biofuel furnace and cause the ash removal controller to operate the ash removal device according to the recalculated rate. For example, the heat production adjuster 638 may operate the ash removal motor 626, such that a ratio of the ash removal rate to the fuel feed delivery rate remains substantially constant, such as about 1%. This constant may depend on the type of fuel being burned. Some woods produce more ash than other woods. Wood pellets typically leave about 1% of their volume as ash.

Fuel takes time to burn. In some embodiments, the heat production adjuster 638 delays operation of the ash removal motor 632 by a predetermined amount of time, such as about 10 minutes, from operation of the fuel feed motor 618. That is, a change in the operation, such as speed, of the fuel feed motor 618 is followed, according to the predetermined amount of time, by a corresponding change in the operation of the ash removal motor 632. The delay may depend on the type of fuel being burned, its density, size or geometry. For example, the delay may be greater for hard woods than for soft woods, and greater for compressed wood, such as pellets, than for stick wood.

Optionally or additionally, the heat production adjuster 638 may repeatedly i.e., continuously, periodically or occasionally, calculate a rate of change of the thermal demand placed on the biofuel furnace, and to repeatedly recalculate the rate at which the fuel feed motor 618 should deliver the fuel to the biofuel furnace, based at least in part on the rate of change of the thermal demand. Adjusting the fuel feed rate, based on the rate of change of the thermal demand, enables the system 100 to anticipate a future thermal demand. For example, if the thermal demand increases over time, it may be assumed that the thermal demand will be even greater in the near future than it currently is. In response, the heat production adjuster 638 may increase the rate fuel is delivered, essentially anticipating a near-future increase in thermal demand. For example, if a desired delta T of inlet and outlet water is 20° F., and the fuel feed motor 618 is operating at 20 Hz, but the delta T is increasing at a rate of 10% per unit time, the heat production adjuster 638 may increase the fuel feed motor 618 rate, and optionally the supply air handler 622 rate, by 10%. Similarly, if the rate of change in the thermal demand were negative, i.e., the thermal demand were decreasing, the heat production adjuster 638 may decrease the fuel feed motor 618 rate, and optionally the supply air handler 622 rate, accordingly.

Optionally or additionally, the heat production adjuster 638 may monitor the temperature of the circulating fluid and adjust the fuel feed rate to prevent boiling or freezing of the fluid.

The heat production adjuster 638 may repeatedly, i.e., continuously, periodically or occasionally, recalculate a rate at which to operate the clinker agitator 626.

Optionally, the system 100 includes one or more oxygen sensors, exemplified by oxygen sensors 638 and 640. An oxygen level calculator 642 is connectable to these oxygen sensors 638-640. For example, the oxygen level calculator 642 may include screw terminals or other types of connectors, by which the oxygen sensors 638-640 may be electrically connected. The oxygen sensors 638-640 generate signals, exemplified by signals 644 and 646, respectively, which the oxygen level calculator 642 receives. The oxygen level calculator 642 repeatedly receives these signals, i.e., the oxygen level calculator 642 continuously, periodically or occasionally samples these signals. Based on these signals, the oxygen level calculator 642 repeatedly, i.e. continuously, periodically or occasionally, calculates one or more current oxygen levels in the biofuel furnace, such as in the firebox, before the catalyst and after the catalyst.

The heat production adjuster 638 is coupled to the oxygen level calculator 642. Optionally or alternatively, the heat production adjuster 638 repeatedly recalculates the rate at which the fuel feed motor 618 should deliver fuel to the biofuel furnace, based at least in part on a current oxygen level. In some embodiments, the heat production adjuster 638 increases, decreases or maintains the rate at which air is delivered to the biofuel furnace, so as to maintain an oxygen level, as described herein. In some embodiments, the heat production adjuster 638 increases, decreases or maintains the rate at which air is delivered to the biofuel furnace, so as to maintain an oxygen level between about 2% and about 4%, so the fuel burns efficiently, although some fuels require lower levels of oxygen to produce biochar or charcoal.

In some embodiments, the heat production adjuster 638 increases, decreases or maintains the rate at which air is delivered to the biofuel furnace, so as to maintain an excess oxygen level at least about 3-4%. This ensures gases entering the catalytic converter have sufficient oxygen to support secondary combustion by the catalytic converter.

Optionally, the heat production adjuster 638 may be coupled to a weather data receiver 648 to receive weather prediction data, including current outdoor condition data. The heat production adjuster 638 may use the received weather prediction data in its calculation of the fuel and/or air delivery rate.

Optionally, the heat production adjuster 638 may be coupled to a remote application interface unit 650. The remote application interface unit 650 may communicate with an application program executed by a mobile device, such as a mobile telephone 652. The communication may be wireless, via an antenna 654, via the Internet 656 or via another wired or wireless connection, such as a telephone line. FIGS. 11 and 12 show exemplary user interfaces of an application program executed by a mobile telephone, according to embodiments of the present invention, through which a user may communicate with the heat production adjuster 638, such as to read and/or set operating parameters.

The amount of heat generated by a biofuel-fired furnace is generally in proportion to the amount of fuel delivered to the furnace, assuming the combustion efficiency remains relatively constant. As described, the fuel-to-air ratio should be maintained as described, to achieve maximum combustion efficiency. However, as described, sometimes this ratio should be altered. For example, additional air should be introduced when the fuel is wet or to revive a dying fire. Additional air cause the fuel to be burned faster, therefore generating heat faster.

We have found that delivering air for a short time, such as about 90 seconds, before beginning delivery of fuel promotes ignition of the delivered fuel by stimulating glowing embers, particularly if the furnace has been idling. Furthermore, we have found that delivering air for a time after ceasing delivering fuel promotes clean operation. For example, typically at the end of a call for heat, fuel feed and air feed typically cease. However, recently delivered fuel continues to burn. Without an adequate air supply, the fuel may smolder, and a catalyst may have insufficient oxygen to combust the smoke. Therefore, we may deliver air, in some cases via a secondary air delivery system downstream of the firebox, but before the catalyst, for a time after fuel feed delivery has ceased. This secondary air may be delivered for a predetermined amount of time, such as based on the amount of fuel typically left at the end of a call for heat.

Optionally or alternatively, an oxygen sensor positioned to measure oxygen levels downstream of the catalyst may be used to determine when to cease delivering air, such as secondary air. In some embodiments, air ceases to be delivered once the post-catalyst gas oxygen concentration reaches ambient, i.e., the concentration of oxygen expected in ambient air drawing in by the air delivery device, such as about 18%.

As noted, the fuel and air feed devices may be operated, based on a sensed thermal demand on the biofuel furnace. Nevertheless, limits may be placed on the rate at which fuel and are delivered to the furnace. These limits may be below the rates calculated based on the thermal demand. For example, the fuel feed rate may be limited, based on weather conditions and/or expected ambient temperatures for a given geographic location or season. In warm climates, or where thermal demands are expected to be infrequent, it may be desirable to feed fuel slowly, so as to reduce cycling of the furnace. In other words, it may be desirable to slow the response of the furnace to a demand for thermal energy or call for heat. This may be accomplished, for example, by limiting the speed of the fuel feed motor 618 in a continuous-feed furnace or limiting primary air delivery 622 to a batch-fed furnace.

Table 2 provides an example of high limit speed settings that can be put on the fuel auger and primary air blower to maximize efficiency of the boiler by reducing furnace cycling.

TABLE 2

| Outside (Ambient) Temperature (° F.) | Fuel Auger/Primary Air Delivery Limit (% of motor rated maximum) |
|---|---|
| 90 | 25 |
| 80 | 30 |
| 60 | 67 |
| 55 | 37 |
| 50 | 40 |
| 45 | 43 |
| 40 | 47 |
| 35 | 50 |
| 32 | 58 |
| 20 | 67 |
| 10 | 75 |
| 0 | 83 |
| −10 | 92 |
| −20 | 100 |
| −40 | 108 |

If the flow rate of the fluid extracting heat from the furnace can be modulated, such as by a variable-speed water pump or variable-speed air blower, the difference between the inlet and outlet temperatures may be maintained constant, and the fluid flow rate can be varied to vary the rate of heat extraction from the furnace. Table 3 provides exemplary values of fluid flow rate for a hypothetical furnace, for four different heat extraction rates (high, medium high, etc.)

TABLE 3

| Burn Category | BTUs | Delta T (° F.) | Gallons per Minute (GPM) (Liquid) | Cubic Feet per Minute (CFM) |
|---|---|---|---|---|
| High | 100,000 | 20 | 10 | 4625 |
| Medium High | 75,000 | 20 | 7.5 | 3472 |
| Medium | 50,000 | 20 | 5 | 2314 |
| Medium Low | 25,000 | 20 | 2.5 | 1157 |
| Low | 10,000 | 20 | 1 | 463 |

If the fluid inlet temperature is not known, a delta T cannot be directly calculated. However, most furnaces have a predetermined, and often user-settable, high limit. The outlet temperature may be used, in conjunction with the high limit, to control the fuel feed motor 618, such as to prevent boiling. The closer the outlet temperature is to the high limit, the lower the limit on the fuel feed motor 618. Table 4 provides exemplary limits on the fuel feed motor 618, based on the outlet temperature, assuming a high limit of about 195° F., and assuming a water out shut-off temperature, i.e., a temperature that will end a call for heat, of about 185° F. Such a limit would increase efficiency of the furnace by reducing furnace cycling.

TABLE 3

| Outgoing Water Temperature (° F.) | Fuel Auger Delivery Limit (% of motor rated maximum) |
|---|---|
| 190 | 25 |
| 185 | 30 |
| 180 | 33 |
| 179 | 37 |
| 178 | 40 |
| 177 | 43 |
| 176 | 47 |
| 175 | 50 |
| 172 | 58 |
| 170 | 67 |
| 165 | 75 |
| 160 | 83 |
| 155 | 92 |
| 150 | 100 |
| 140 | 108 |

Figure 7:
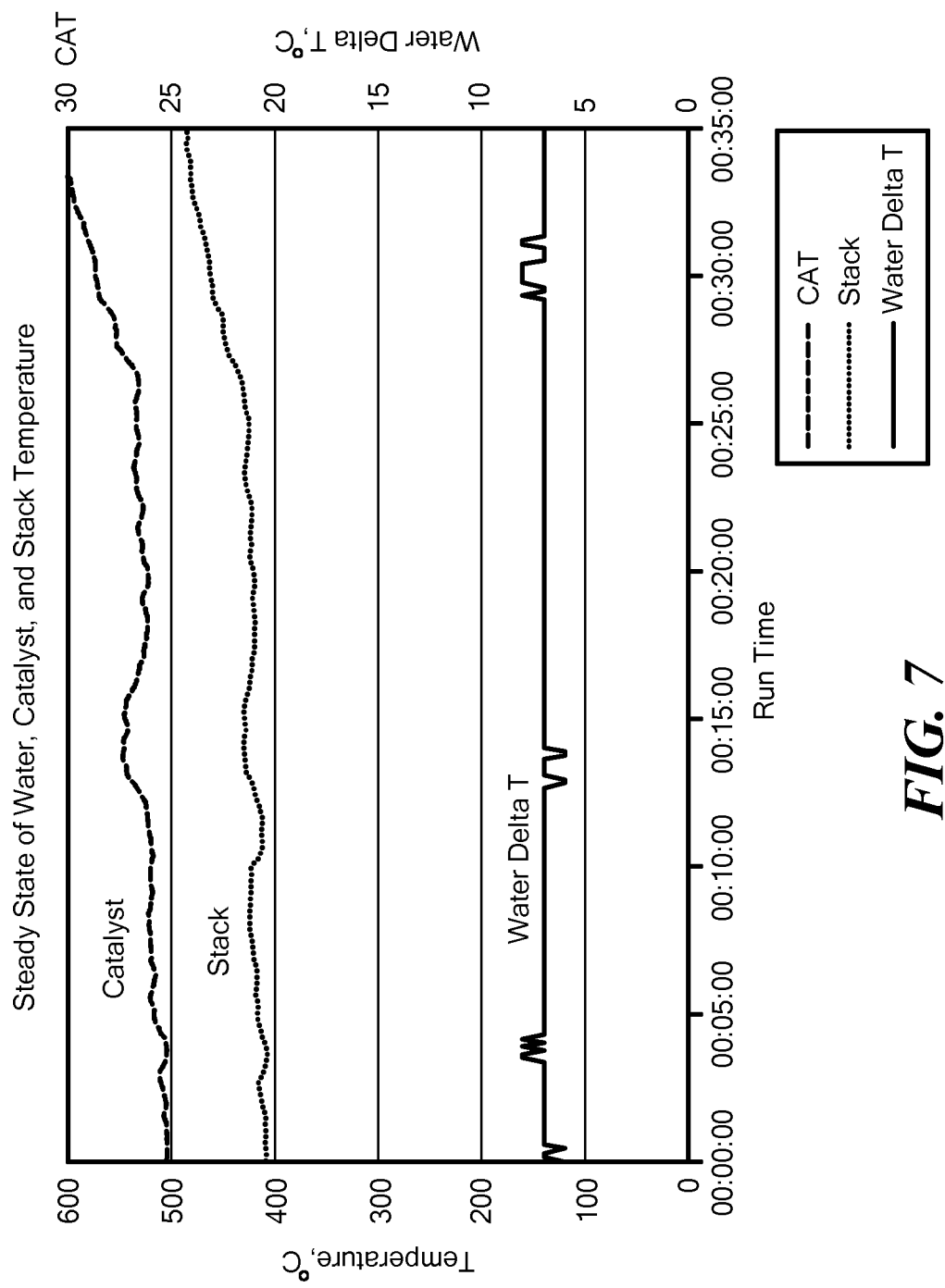
FIGS. 7, 8, 9 and 10 are graphs of actual data collected from embodiment of the present invention.

FIG. 7 is a graph of actual data collected from an embodiment of the present invention. The graph plots a difference between inlet and outlet water (delta T), stack temperature and catalyst temperature, over time, in an idle furnace. The graph illustrates the system's ability to maintain a very constant delta T by adjusting, in real-time or near real-time, the amount of fuel and air delivered to the furnace. Note the delta T varies by no more than one degree (Fahrenheit) over a 35 minute test.

Figure 8:
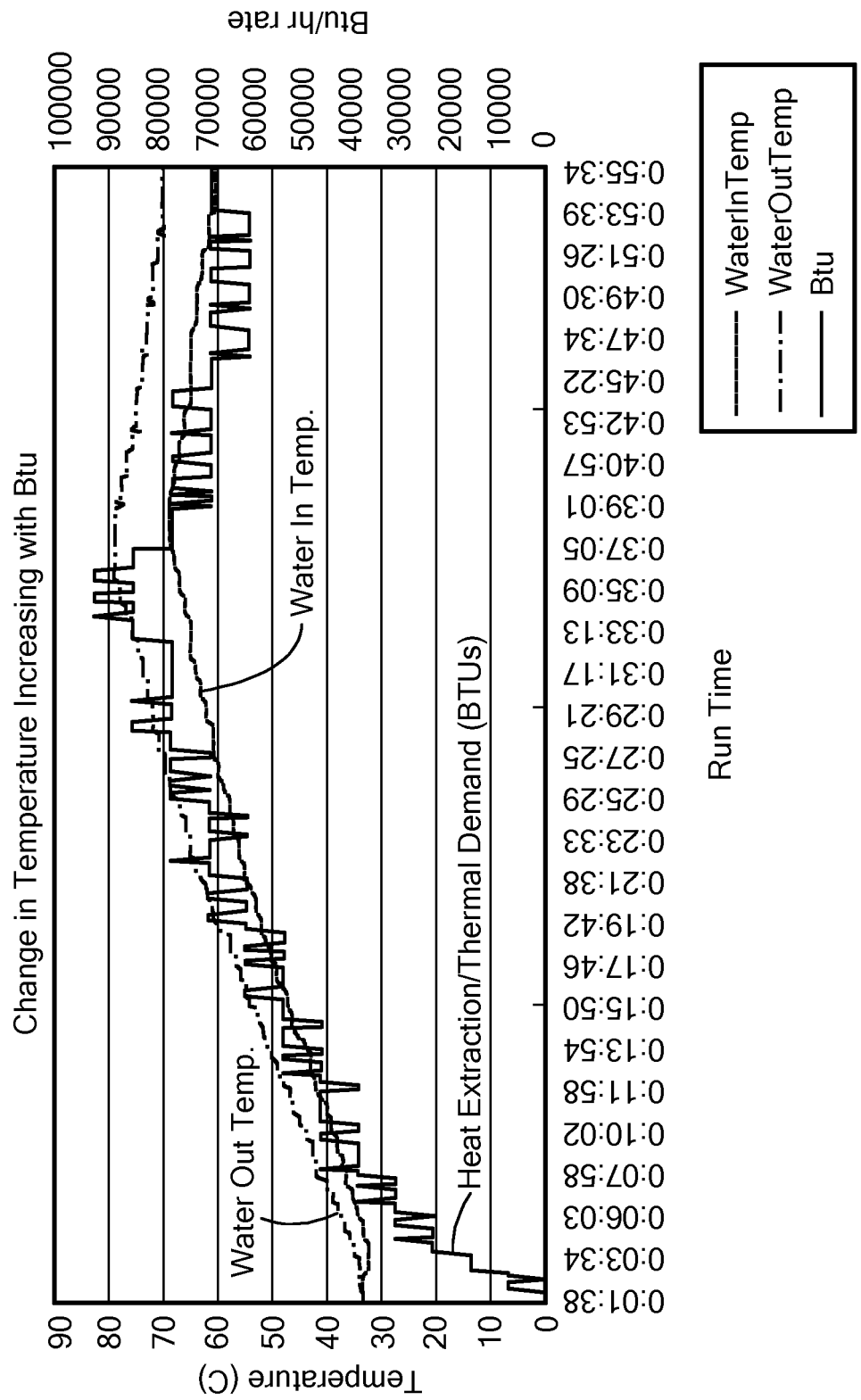

FIG. 8 is a graph of actual data collected from an embodiment of the present invention. The graph plots inlet water temperature, outlet water temperature and thermal extraction in BTUs, over time, in response to a call for heat. At the beginning of the graph, the delta T and the amount of heat extracted from the furnace are essentially zero. However, the call for heat causes the controller to deliver fuel and air to the furnace. As a result, the fire intensity increases, and the circulating water extracts heat. The amount of heat extracted increases smoothly, until it plateaus at about time 33 minutes. Similarly, the delta T increases smoothly over the same time period. For about four minutes, the rate of heat extraction, and the delta T, remain about constant, and then they begin to decrease, indicating the space being heated has reached its desired temperature, and now heat need to be added only to compensate for heat lost from the space. The rate of fuel delivered to the furnace, although not shown in FIG. 8, can be inferred from the heat extraction/thermal demand line. Heat generation lags fuel delivery by a short time. Thus, the fuel delivery leads the heat generation by a short time.

Figure 9:
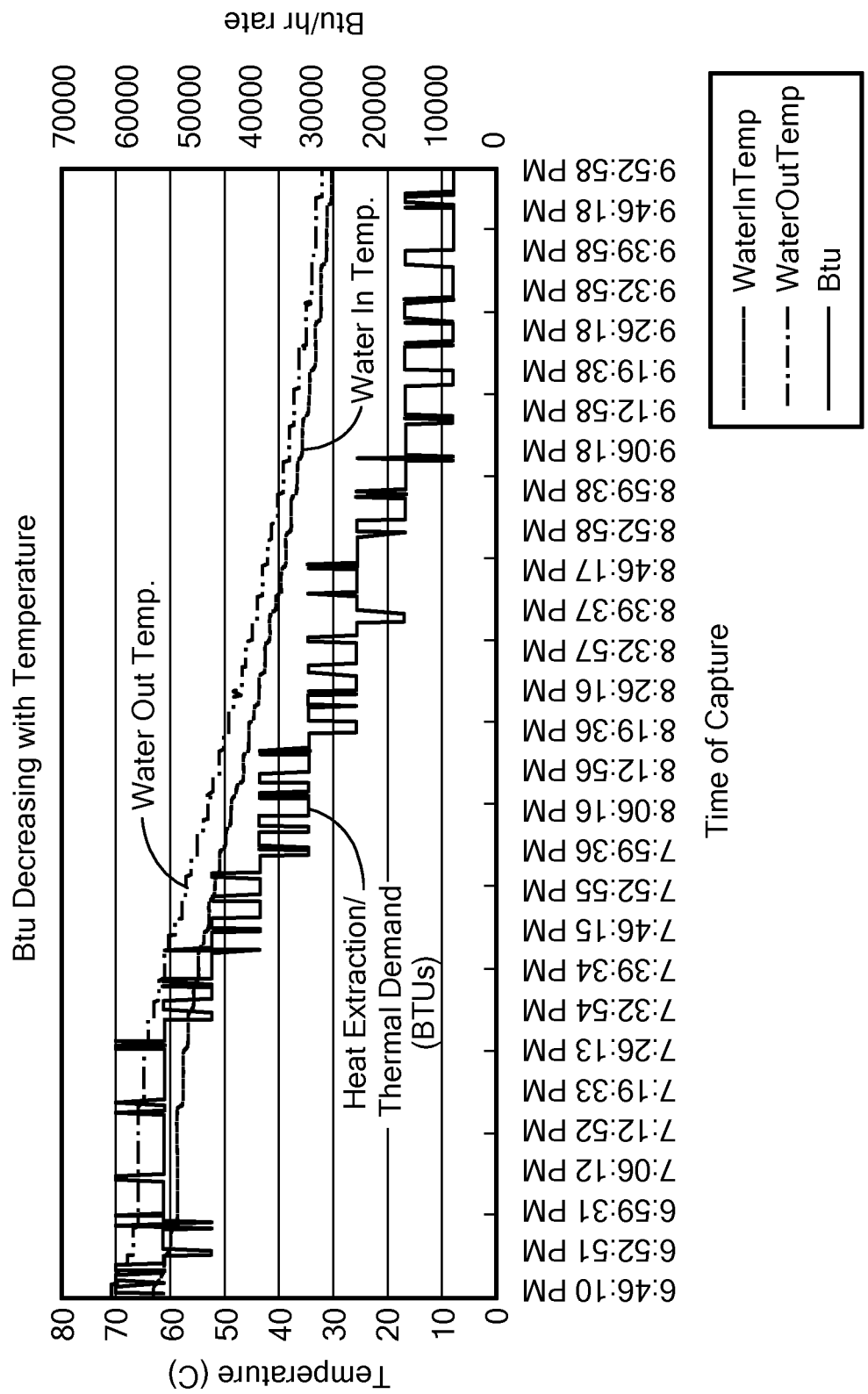

FIG. 9 is a graph of actual data collected from an embodiment of the present invention. The graph of FIG. 9 is similar to the graph of FIG. 8, except the experiment was conducted during a time of decreasing calls for heat. As can be seen, the system smoothly decreased the amount of heat generated by the furnace.

Figure 10:
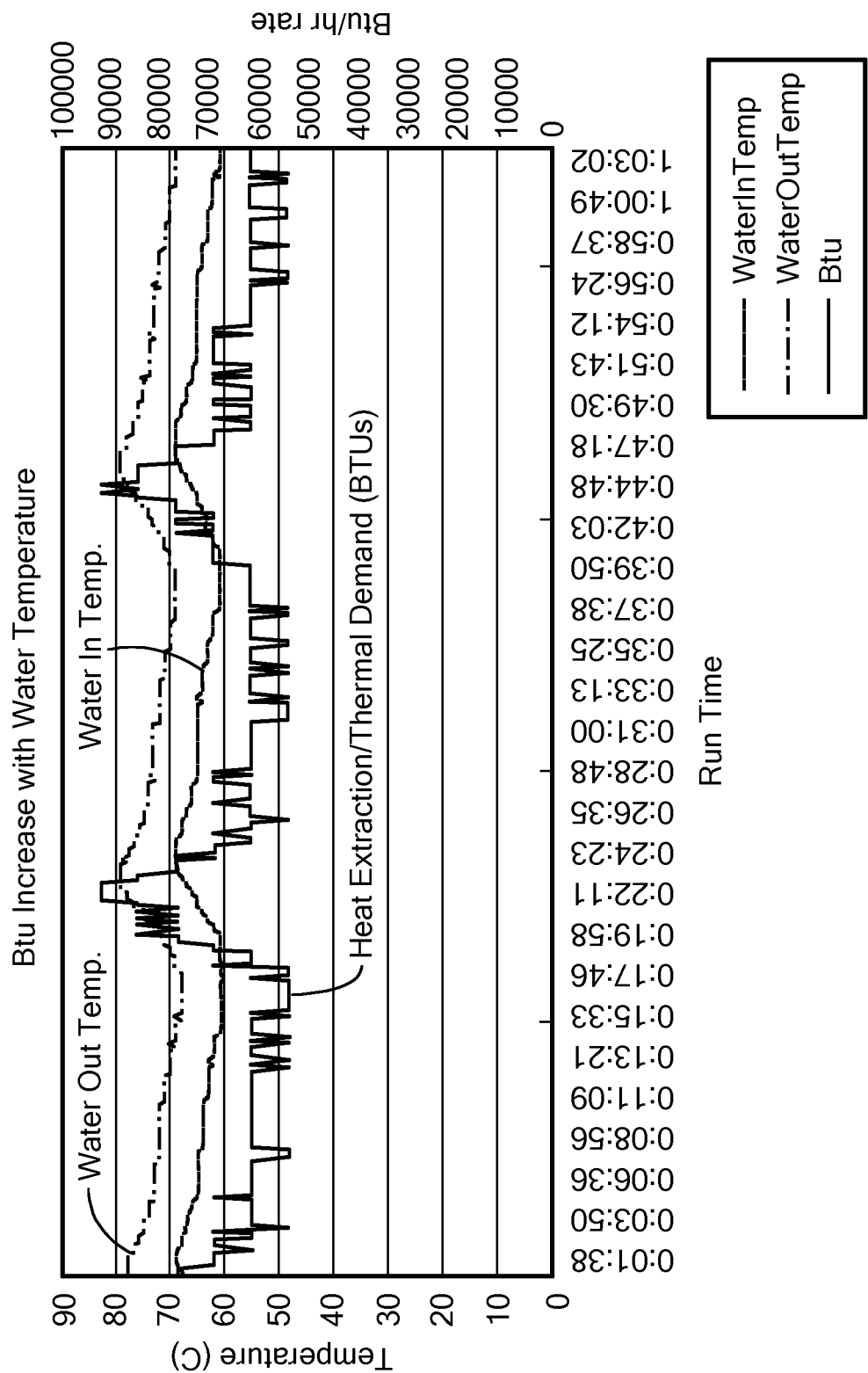

FIG. 10 is a graph of actual data collected from an embodiment of the present invention. The graph of FIG. 10 is similar to the graph of FIG. 9, except the experiment was conducted so as to include two calls for heat, one at about 18 minutes and the other at about 40 minutes.

These and other embodiments are described in more detail below.

Intelligent Controller, Sensors and Controlled Devices

FIG. 1 is a schematic block diagram of one illustrative embodiment of the present invention. A bio-fuel fired device 100 has an air inlet 104 to provide oxygen for a fire within a fire box 108. In some cases, bio-fuel is placed in the fire box 108, either manually or by an automatic mechanism, such as an auger 115, and the bio-fuel burns in the fire box 108. In other cases, commonly referred to as wood gas generators or "gasification units," bio-fuel is heated in one chamber to release volatile gases therefrom, and the gases flow into a subsequent chamber where they burn. However, for simplicity of explanation, we use the term fire box 108 to mean all such cases, unless the context indicates otherwise. Various sensors and controlled devices are disposed within the bio-fuel fired device 100, as described below. These sensors and controlled devices are coupled to an intelligent controller 109, also as described in more detail below.

A controllable damper 110 controls the amount of air permitted to enter the air inlet 104. The controllable damper 110 may be binary, in that the damper 110 may be either fully open or fully closed. Optionally or alternatively, the controllable damper 110 may include a set of binary dampers that progressively open to permit progressively more air to enter the air inlet 104. Optionally or alternatively, the controllable damper 110 may include a variable vane to control (in steps or infinitely) the amount of air that enters the air inlet 104. Optionally, a controllable blower 114 drives ambient air through the damper 110 into the fire box 108. The blower 114 may be a fixed-speed or a variable-speed blower. Optionally or alternatively, a set of progressive blowers may be used. For simplicity of explanation, the terms damper and blower refer to either a single or a staged damper or blower, as the case may be.

A water jacket or air jacket (for simplicity collectively referred to herein as a water jacket 118) may surround at least a portion of the fire box 108 or another portion of the device 100 to heat water or air in the jacket 118 from the fire. The heated water or air may be used directly or indirectly to cook food, roast coffee beans, heat a dwelling, meet domestic hot water needs or for another purpose. In some cases, no jacket 118 surrounds the fire box 108. Instead, radiant or conductive heat from the fire box 108 is used directly, such as to cook food, roast coffee beans, etc. Optionally or alternatively, a water or air jacket 131 may surround at least a portion of the PCD 140 to extract heat from the PCD 140. The heat extracted from the PCD 140 may be augment the heat extracted by the water jacket 118, or it may be used for another purpose.

The water jacket 118 may be equipped with one or more sensors. For example, an inlet temperature sensor 120 and an outlet temperature sensor 124 may sense temperatures of water flowing into and out of the jacket 118. The temperature sensors 120 and 124 may be thermistors, thermocouples, infrared temperature sensors or other suitable temperature sensors. The return temperature may be used by the intelligent controller 109 to anticipate a demand for heat and, in response, begin or accelerate the combustion process, in order to level out the heating cycle and keep the water jacket temperature from falling rapidly. For example, if the difference in temperatures between the inlet temperature sensor 120 and the outlet temperature sensor 124 is greater than about 20° F., the intelligent controller 109 may open the damper 110 and/or operate the blower 114. The return temperature may also be used by the intelligent controller 109 to calculate a delta heat loss or use. The return temperature may be compared to the inlet temperature to calculate demand, BTU consumption and, when combined with a time stamp, the intelligent controller 109 may learn heating use patterns and times or days of the week that the unit is typically idle.

As noted, a difference between the inlet and the outlet temperatures, in conjunction with the flow rate and knowledge of the heat constant of the fluid, enables calculation of an amount of heat being extracted from the furnace 100. In some embodiments, an automatic variable speed pump circulates the fluid through the jacket 118 and/or 131. The pump automatically varies its speed, so as to maintain a predetermined temperature difference (delta T) between the input fluid and the output fluid. In this case, the controller 109 need not measure the fluid temperature. Instead, the controller 109 may assume the temperature difference is maintained by the pump, and the controller 109 needs only the flow rate of the fluid to calculate the amount of heat being extracted from the furnace 100. Such an automatic variable speed pump is available from Taco Inc., 1160 Cranston St., Cranston, R.I. 02920.

A temperature sensor 128, such as an aquastat, thermistor or thermocouple, may be attached to the water jacket 118 in a well-known manner. When the water jacket temperature falls below a set point, such as about 175° F., a conventional boiler controller would open the air damper 110 and operate the blower 114 to burn fuel to heat the water. However, as noted, starting or resuming the fire while the catalyst is still below its operating temperature may cause problems, as described above.

A low water level sensor 130 may be disposed within the water jacket 118. A low water condition may cause the intelligent controller 109 to illuminate a warning indicator among the indicator lights 129 and close the air damper 110 and cease operating the blower 114, so as to extinguish the fire and prevent damage to the fire box 108 or water jacket 118.

Figure 2:
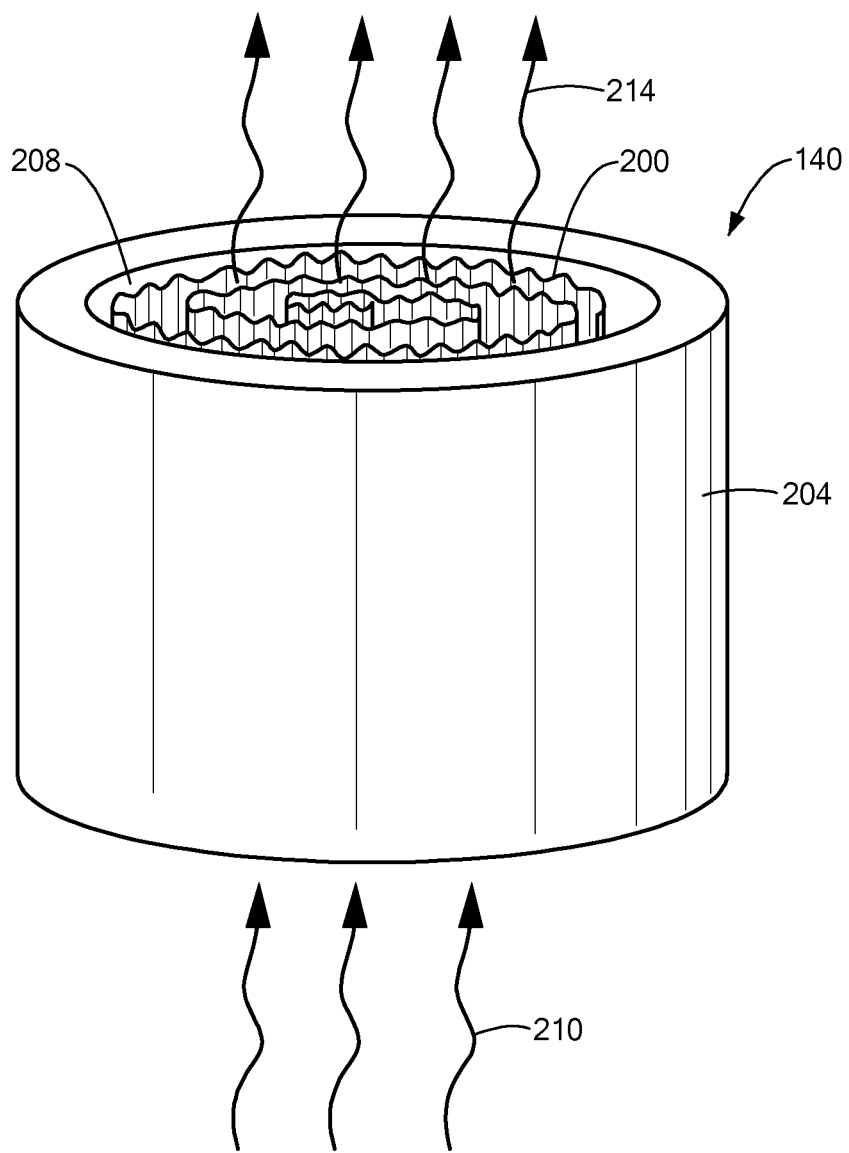
FIG. 2 is a perspective side view of the catalyst-based pollution control device of FIG. 1.

Exhaust from the fire box 108 exits, typically via a flue 134, and enters a pollution control device 138, where it passes through or over a catalyst 140. The catalyst 140 operates according to well-known chemical principles to combust at least a portion of unburned exhaust from the fire box 108. In some embodiments, as shown in FIG. 2, the catalyst 140 includes a thin, such as about 0.004 inch thick, ribbon 200 of suitable material, such as stainless steel, to which an appropriate catalyst material has been adhered. The ribbon 200 may be corrugated or formed into a "herringbone" pattern to increase its surface area and wound into a spiral and bound by a band 204. The band 204 defines a top opening 208 and a bottom opening (not visible). Smoke and other gases enter the catalyst 140 via the bottom opening, as indicated by arrows 210, and exit the catalyst via the top opening 214. A suitable catalytic material is available from Catalytic Combustion Corporation, 709 21st Avenue, Bloomer, Wis. 54724.

Returning to FIG. 1, the pollution control device 138 includes one or more temperature sensors, such as temperature sensor 144 at an input port of the pollution control device 138 and temperature sensor 148 at an output port. Optionally or alternatively, one of the two temperature sensors 144 or 148, or a third temperature sensor 150, may be directly attached to the catalytic converter 140 to obtain a more direct temperature of the catalyst. We have found that temperature sensors located above the catalytic converter 140 may sense temperatures as much as about 100-200° F. lower than the catalytic converter 140, due to cooling of gases as they flow through the stack 172. The stack 172 may be long, or ambient temperatures may be very low, leading to this cooling. Thus, the temperature sensor 150 may yield a more accurate catalyst temperature than the other temperature sensors 144 and 148.

Some embodiments of the present invention control a heater configured to bring a catalytic converter up to operating temperature (catalytic ignition temperature ("activation temperature"), such as between about 350° F. and about 600° F.). In most such embodiments, the heater includes a resistive electric heater; however, other types of heaters, such as propane-fired, microwave or infrared heat lamp heaters, may be used. Some embodiments prevent major, or in some cases any, burning of bio-fuel until the catalytic converter reaches operating temperature. For example, some embodiments prevent opening a damper or a fan that permits air to enter a fire box until the catalytic converter reaches operating temperature. Some embodiments prevent ignition of a fire in the fire box or other burning apparatus until the catalytic converter reaches operating temperature.

It is well known that conventional bio-fuel fired appliances equipped with conventional catalytic converters emit undesirably high levels of smoke and other pollutants during cold starts, i.e., before the catalytic converters reach operating temperature, because the catalytic converters are too cold to operate effectively. The above-described embodiments pre-heat a catalytic converter, so it is ready to operate effectively before a bio-fuel fire generates significant quantities (or, in some embodiments, any) smoke.

Some embodiments measure the temperature of the catalytic converter and control the heater based on catalytic converter's temperature. Some embodiments measure additional or other quantities, such as stack temperature, and control the heater based on the measured quantities.

Figure 3:
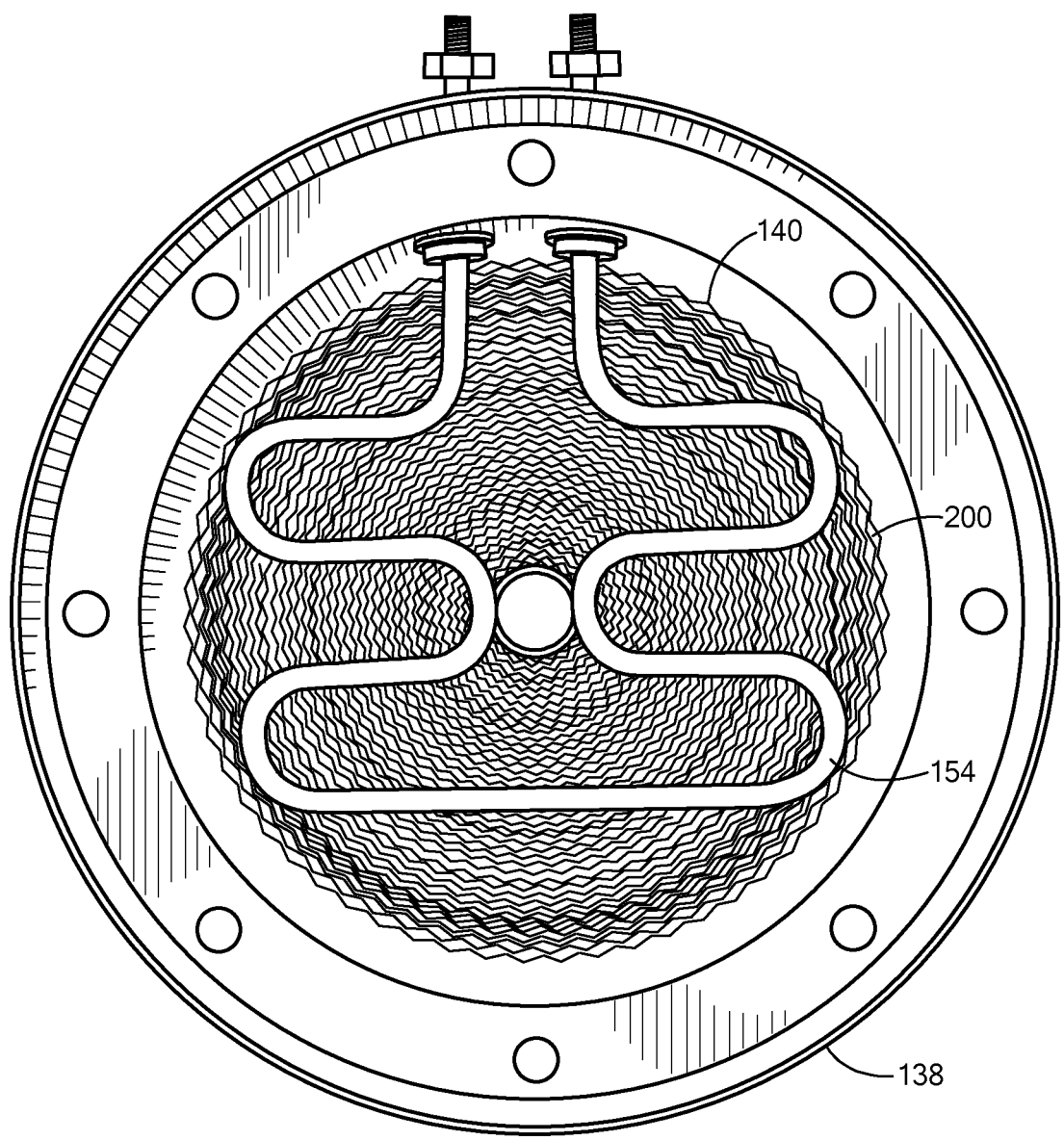
FIG. 3 is a bottom-of-stack view of the pollution control device of FIG. 1.

The pollution control device 138 includes a suitable heater 154 located below or otherwise adjacent the catalyst 140. In one embodiment, a 900-1100 watt resistive electric heater is used. FIG. 3 is a bottom view of the heater 154 installed below the catalyst 140. Optionally or alternatively, another suitable type of heater may be used, such as an infrared lamp, a propane-fired heater or a microwave heater.

Returning again to FIG. 1, an oxygen sensor 160 may be disposed above the catalytic converter 140. An additional oxygen sensor 164 may be disposed below the catalytic converter 140. These two sensors 160 and 164 enable the intelligent controller 109 to ascertain the amount of oxygen consumed by the catalytic process by subtracting the oxygen level sensed by the upper oxygen sensor 160 from the oxygen level sensed by the lower oxygen sensor 164. The amount of oxygen in gas upstream of the catalytic converter 140, i.e., between the fire box 108 and the catalyst 140, is referred to as "pre-catalyst" oxygen level, and the amount of oxygen in gas downstream of the catalytic converter 140, i.e., between the catalyst 140 and the top of the stack 172, is referred to as "post-catalyst" oxygen level. Similarly, pre-catalyst temperature and post-catalyst temperature refer to temperatures upstream and downstream of the catalyst 140, respectively.

A pressure sensor 168, located below the pollution control device 138 or embedded in the draft inducer 174, enables the intelligent controller 109 to detect back pressure, such as back pressure that may be caused by a clogged catalytic converter 140. Similarly, insufficient gas flow, detected by a gas flow sensor 170, may indicate the catalyst 140 is clogged. In either case, the intelligent controller 109 may raise an alarm to indicate that maintenance is needed. In response to detecting insufficient gas flow in the flue/stack 172, the intelligent controller 109 may also activate a draft inducer 174, open or further open the damper 110, operate or speed up the blower 114 or adjust operation of some other controlled device.

A top-of-stack temperature sensor 176 detects the temperature of gases exiting the stack 172. An air injector 178 may be operated by the intelligent controller 109 to inject oxygen into the flue 134 or directly into the pollution control device 138. A smoke detector 180 may be installed at or near the top of the stack 172 to detect presence of smoke. The smoke detector 180 may be of any suitable type, such as optical or ionization.

Various ambient condition sensors, such as an ambient temperature sensor 181, an ambient humidity sensor 182 and an ambient barometric pressure sensor 184, may be coupled to the intelligent controller 109 to provide information about ambient conditions. Set point temperature controls, such as a water jacket set point temperature control 186 and a room set point temperature control (thermostat) 188, may also be coupled to the intelligent controller 109. A fire box door open switch 189 may be coupled to the intelligent controller 109. A mode switch 190 (described in more detail below) may also be coupled to the intelligent controller 109.

The intelligent controller 109 may be coupled to a suitable wireless transmitter and antenna 192 to enable the intelligent controller 109 to send information, such as to a remote data recorder 194 and/or a mobile communication device 196, such as a mobile telephone. Similarly, the intelligent controller 109 may receive commands and/or settings from the mobile telephone and change its operating parameters accordingly. FIGS. 11 and 12 show exemplary user interfaces of an application program executed by a mobile telephone, according to embodiments of the present invention.

The intelligent controller 109 performs its functions by executing computer instructions stored in a memory, which may be part of or separate from the controller 109. As a result of executing these instructions, the intelligent controller 109 reads values from the sensors, switches, controls, etc. (collectively referred to herein as sensors) performs calculations, compares values to predetermined and/or calculated limits, follows rules, learns operating parameters and ambient conditions and controls operation of the dampers, blowers, etc., based on the calculations, limits, rules, etc., to improve combustion efficiency of a heating device.

Like the patented system described in *Diamond v. Diehr* (450 U.S. 175 (1981), embodiments of the present invention monitor process parameters and control inputs and outputs of a heating device to improve its operation and provide a concrete, tangible and useful result, i.e., an efficient combustion of fuel. *Diamond v. Diehr* concerned a process of molding rubber in which the temperature of the mold is constantly monitored. The temperature measurements are sent to a computer that uses an algorithm to repeatedly recalculate the cure time of the rubber and, when the recalculated cure time is equal to the time elapsed since the mold was closed, the computer signals a device to open the mold. This method of manufacturing molded articles was found not to be precluded from being patented "simply because it uses a mathematical formula, computer program, or digital computer."

Figure 4:
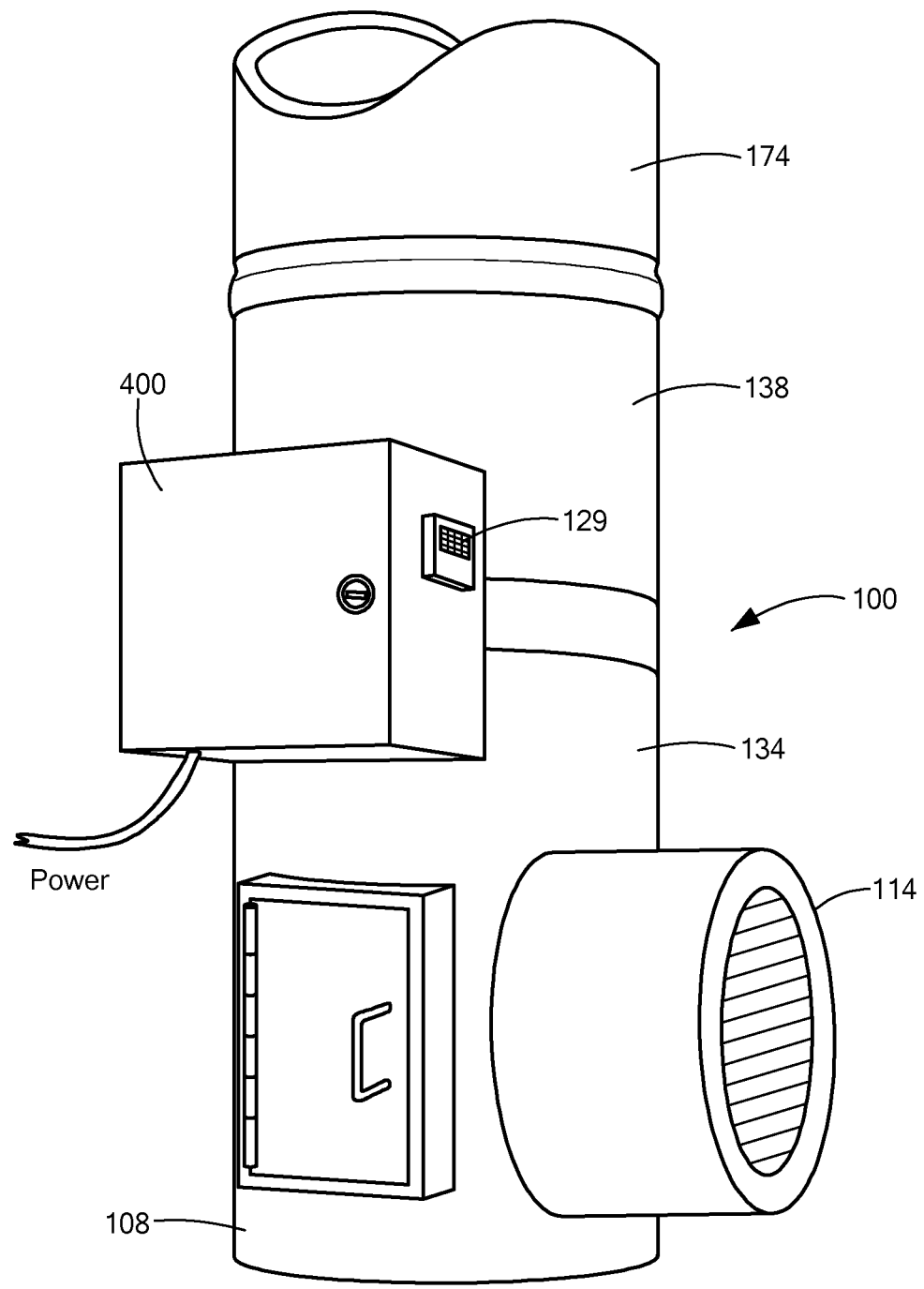
FIG. 4 is a perspective side view of the intelligent bio-fuel controller attached to a flue and a bio-fuel fired device, as in the embodiment of FIG. 1.

In some embodiments, as shown in FIG. 4, the intelligent controller 109 and, optionally, some of the switches and/or controls are enclosed in a housing 400 that may be attached to the flue 134 of a bio-fuel fired device 100. In other embodiments (not shown), the intelligent controller 109, or a circuit that implements a subset of the functionality of the intelligent controller 109, is provided in a housing, with or without the pollution control device 138, but without the fire box 108, air damper 110, etc. In yet other embodiments (not shown), the pollution control device 138, including the catalytic converter 140 and the heater 154 and, optionally, one or more sensors, is provided, absent the intelligent controller 109, fire box 108, air damper 110, etc. In other words, various embodiments may include packages of various combinations of the items described herein.

Returning again to FIG. 1, according to some embodiments of the present invention, when the water jacket temperature falls below the set point, if the catalyst 140 is below its minimum activation temperature (as indicate by the catalytic converter temperature sensors 150, 148 and/or 144), the intelligent controller 109 operates the heater 154, until the catalyst 140 reaches its minimum activation temperature. The minimum activation temperature of the catalyst 140 depends on the construction and composition of the catalyst 140. A typical minimum activation temperature for some common catalysts is about 210° F. for CO reduction and about 510° F. for particulate reduction.

While the catalyst 140 is being electrically heated, the intelligent controller 109 does not open the air damper 110 or operate the blower 114. That is, opening the air damper 110 and operating the blower 114 are delayed until the catalyst 140 reaches a predetermined temperature. Once the catalyst 140 reaches the first predetermined temperature, such as about 450° F. or about 100-150° F. above the activation temperature, the intelligent controller 109 opens the air damper 110 and allows heated air from the fire box 108 to move to the catalyst 140. This stage is called a Pre-Heat Stage. Many cooking and heating devices are air tight, and opening their dampers allows air heated by the heater 154 to rise to the catalyst 140. Next, the controller enters a Boost Stage.

When the catalyst 140 reaches a second predetermined temperature, such as about 600° F., the intelligent controller 109 operates the blower 114. Consequently, the catalyst 140 is not subjected to smoke until it has reached its minimum operating temperature. Optionally, the electric heater 154 may continue to be operated to further heat, or to maintain the temperature of, the catalyst 140, even after the air damper 110 is opened and while the blower 114 is operated. This can be influenced by ambient temperature. If the damper 110 and blower 114 are pushing cold air, such as below about 0° F., into the fire box 108, the catalyst 140 can be cooled, if the fired box 108 is cold. This is often the case when the door is open during a cold start and during or after a fuel reload.

If, however, the catalytic converter 140 is already (or still) at or above its minimum operating temperature and the water jacket 118 temperature falls below the set point, the intelligent controller 109 may open the air damper 110 and operate the blower 114 without delay.

Even while a fire actively burns in the fire box 108, such as during a call for heat, the catalyst 140 may cool down, such as on very cold days or when the damper 110 is first opened and the blower 114 is operated, but before the fire in the fire box 108 has reached a sufficient heat intensity. This often occurs during a cold start or fuel reload. While the damper 110 is open or the blower 114 is operating, if the catalyst temperature falls below a predetermined value, such as its minimum operating temperature or another predetermined value above or below the minimum operating temperature, such as about 510° F., the intelligent controller 109 may operate the electric heater 154 to further heat, or maintain the temperature of, the catalyst 140. Optionally, the intelligent controller 109 may also close the air damper 110 and/or cease operating the blower 114 until the catalyst 140 reaches another predetermined temperature. Note that closing the air damper 110 and/or ceasing operation of the blower 114 may be done in stages. Thus, the air damper 110 may be partially closed and the speed of the blower 114 may be reduced. Similarly, if several air dampers 110 and/or blowers 114 are operated in parallel (staged), a portion of the air dampers may be closed or a portion of the blowers may be shut down.

Optionally or alternatively, other measured parameters may be used by the intelligent controller 109 to determine when to open the air damper 110, operate the blower 114 and or operate the electric heater 154. In some embodiments, ambient temperature, humidity and/or barometric air pressure (as measured by sensors 181-184) may be used as part or all of this determination. In one embodiment, if the ambient temperature is below a predetermined value, such as about 0° F., the intelligent controller 109 may further delay opening the air damper 110 and operating the blower 114, thereby heating the catalyst 140 to a temperature greater than the minimum operating temperature, on the assumption that an inrush of cold air would reduce the catalyst temperature below its minimum operating temperature.

The temperature (above the minimum operating temperature discussed above) to which the catalyst 140 is raised before opening the damper 110 and operating the blower 114 may depend on, such as being proportional to, the amount by which the ambient temperature is below the predetermined value (such as about 0° F.). For example, for each degree of ambient temperature below 0° F., the catalyst 140 may be heated one additional degree above its minimum operating temperature. Similarly, a relatively high humidity level may cause the intelligent controller 109 to further delay opening the air damper 110 and operating the blower 114. For example, if the relative humidity is higher, the catalyst 140 may be heated more, by an amount proportional to the relative humidity or by an amount by which the relative humidity exceeds a predetermined value.

Optionally, if the catalyst 140 exceeds a predetermined temperature, such as about 1,600° F., the intelligent controller 109 closes the air damper 110 and ceases operating the blower 114. Once the catalyst 140 has cooled sufficiently, i.e., reached a safe operating temperature, the intelligent controller 109 may again open the air damper 110 and operate the blower 114, if needed to maintain the water jacket 118 temperature according to its set point.

Catalysts typically require a minimum amount of oxygen to operate. Optionally, the air injector (fan or blower) 178 may be included to inject air into the input gas stream to the catalytic converter 140. The oxygen sensor(s) 164 and/or 160 may sense the concentration of oxygen in flue gases passing into or out of the catalytic converter 140. If the concentration of oxygen is below a predetermined value, such as about 3% above the catalyst 140, the intelligent controller 109 may operate the air injector 178 to introduce oxygen-containing air into the stream.

Some United States states, such as New Jersey, have regulations that do not permit visible emissions from outdoor hydronic heaters/wood furnaces for more than three minutes within a thirty minute period. Large amounts of smoke might be exhausted as a result of any of several situations, including a raging fire or the fire box 108 having been loaded with a large quantity of fuel, a large quantity of small pieces of fuel with a large collective surface area or wet or green fuel. In such a situation, when the oxygen level above the catalyst 140 is below a (possibly variable) set point (indicating smoke production), the intelligent controller 108 may close the dampers 110 and cease operating the fans 114 to prevent the smoke from leaving the flue 172. As noted, the smoke detector 180 at the top of the stack 172 may be used to detect smoke being exhausted by the device 100.

The catalytic converter 140 and the intelligent controller 109 may be constructed as part of a biofuel-fired device or as an add-on to the device. A wood furnace may also be constructed using the intelligent controller 109 to manage the combustion of the wood furnace. A wood furnace may be constructed so as to accept an add-on intelligent controller 109 later, such as when it becomes more economically advantageous to do so or after air quality regulations in a geographic area become more stringent.

State Machine Embodiment

In general, in some embodiments, the intelligent controller 109 may execute as a finite state machine, where at least some of the states correspond to stages we have identified in the operation of a well-managed bio-fuel fired device 100. Table 1 lists the primary states of such a state machine, according to some embodiments. Other embodiments may have more, fewer or different states. Exemplary states are described in more detail below the table.

Each state defines conditions necessary to change to at least one other state. For example, according to one embodiment, in the Preheat State, the heater 154 is operated to heat the catalyst 140. To progress from the Preheat State to the Boost State, the post-catalyst temperature needs to have reached a predetermined value (represented by a variable named Preheat_State_Cat_Min_Temp) and a predetermined amount of time (represented by a variable named Preheat_State_Cat_Min_Temp_Time) needs to have transpired during which the heater 154 has operated.

More than one condition may be specified for changing to another state. For example, in the Preheat State, if the post-catalyst temperature reaches a predetermined value (represented by a variable named Preheat_State_ Cat_Esc_Temp), the state may be changed to the Boost State, even if Preheat_State_Cat_Min_Temp_Time time has not yet expired.

Each state may define one or more conditions under which control passes to an earlier state. For example, in the Run State, if the post-catalyst temperature drops to less than a predetermined temperature (represented by a variable named Run_State_Cat_Min_Temp) for at least a predetermined amount of time (represented by a variable named Run_State_Min_Temp_Time), then the catalyst heater 154 may be re-energized and the Boost State may be re-entered.

Each state may define one or more error conditions. For example, in the Preheat State, if a predetermined amount of time elapses (represented by a variable named Preheat_State_Max_Time) without the post-catalyst temperature reaching either predetermined value described above, it may be assumed that the fuel has been exhausted or some other condition prevents a fire from starting or resuming, and the intelligent controller 109 may de-energize the catalyst heater 154 and set Lockout State. Such a transition prevents, for example, burning out the heater 154 as a result of excess operation. Manual intervention, such as depression of the reset switch 198, may be required by the intelligent controller 109 before the Lockout State is allowed to be exited.

TABLE 1

State Machine States

Startup State
Cold Startup State
Warm Startup State
Preheat State
Reheat Stat
Boost State
Run State
O2 Recovery State
Idle State
Lockout State Startup State—Energize catalyst heater 154, start the preheat state timer and set Preheat State.

Preheat State—If the post-catalyst temperature reaches Preheat_State_Cat_Min_Temp, and Preheat_State_ Cat_Min_Temp_Time minutes have elapsed on the preheat state timer, then start the boost state timer, open the damper 110 and set the Boost State. If the post-catalyst temperature reaches Preheat_State_Cat_Esc_Temp, then start the boost state timer, open damper 110 and set the Boost State. If Preheat_State_Max_Time minutes have elapsed while the controller is operating in this Preheat State, then de-energize the catalyst heater 154 and set Lockout State. Lockout State may be entered if, for example, the burner is out of fuel and thus will not fire and reach an operating temperature, regardless of how long the damper 110 is open.

Reheat State—If the post-catalyst temperature reaches Reheat_State_Cat_Min_Temp and Reheat_State_Min_Temp_Time minutes have elapsed on the preheat state timer, then start the boost state timer, open the damper 110 and set the Boost State. If the post-catalyst temperature reaches Reheat_State_Cat_Esc_Temp, then start the boost state timer, open the damper 110 and set the Boost State. If the post-catalyst temperature drops to less than or equal to Reheat_Blower_Stop degrees, then de-energize the blower 114. If Reheat_State_Max_Time minutes have elapsed while the controller is operating in this Reheat State, then de-energize the catalyst heater 154, close the damper 110 and set Lockout State.

Boost State—If the post-catalyst temperature remains greater than or equal to Boost_State_Cat_Dwell_Temp, then wait for Boost_State_Dwell_Temp_Time minutes to elapse on the boost state timer and then energize the blower 114, start the run state timer and set Run State. If the post-catalyst temperature reaches Boost_State_Cat_Esc_Temp, then set Run State. If the post-catalyst temperature drops to less than or equal to Boost_State_Cat_Min_Temp, then start the reheat state timer and set the Reheat State.

Run State—If the post-catalyst temperature remains greater than or equal to Run_State_Cat_Dwell_Temp for Run_State_Dwell_Temp_Time, then de-energize the catalyst heater 154. If the post-catalyst temperature drops to less than or equal to Run_State_Cat_Min_Temp for Run_ State_Min_Temp_Time, then energize the catalyst heater 154, start the boost state timer and set the Boost State.

Idle_State—If the controller is operating in Slave Mode, then energize the Call For Heat LED in the indicator lights 129 and set the Startup State. If the controller is operating in Master Mode, then open the damper 110 and energize the blower 114 for Blower_Exercise_Interval_Time per each Blower_Idle_Interval_Time time interval.

Lockout State—If the reset switch 198 is pressed for more than one second and then released, then extinguish the Lockout LED 129 and set the Idle_State.

Table 2 lists exemplary values for variables referenced in Table 1, as well as other variables that may be used.

TABLE 2

| Variables (One embodiment) | |
|---|---|
| Startup_State_Max_Time | 30 min. |
| Startup_State_Esc_Water_Jacket_Temp | 100° F. |
| Startup_State_Cat_Esc_Temp | 599° F. |
| Startup_State_Min_Time | 10 min. |
| Preheat_State_Cat_Min_Temp | 140° F. |
| Preheat_State_Cat_Min_Temp_Time | 5 min. |
| Preheat_State_Cat_Esc_Temp | 449° F. |
| Preheat_State_Max_Time | 60 min. |
| Preheat_State_O2_Esc | 6.5% |
| Reheat_State_Cat_Min_Temp | 446° F. |
| Reheat_State_Min_Temp_Time | 5 min. |
| Reheat_State_Cat_Esc_Temp | 449° F. |
| Reheat_Blower_Stop | 302° F. |
| Reheat_State_Max_Time | 60 min. |
| Reheat_Blower_Stop_Temp | 302° F. |
| Reheat_State_O2_Esc | 6.5% |
| Reheat_State_Lockout_Max_Time | 240 min. |
| Boost_State_Cat_Dwell_Temp | 527° F. |
| Boost_State_Dwell_Temp_Time | 2 min. |
| Boost_State_Cat_Esc_Temp | 653° F. |
| Boost_State_Cat_Min_Temp | 446° F. |
| Boost_State_O2_Esc | 6.5% |
| Run_State_Cat_Dwell_Temp | 599° F. |
| Run_State_Dwell_Temp_Time | 2 min. |
| Run_State_Cat_Min_Temp | 599° F. |
| Run_State_Min_Temp_Time | 60 min. |
| Run_State_O2_Esc | 5% |
| Run_State_Inducer_Min_Temp | 599° F. |
| Run_State_Inducer_Lockout_Cat_Temp | 1900° F. |
| Run_State_O2_Min_Value | 7% |
| Run_State_O2_Min_Time | 6 min. |
| O2_Recovery_State_Min_Value | 6.5% |
| O2_Recovery_State_Max_Time | 15 min. |
| O2_Recovery_State_Min_Cat_Temp | 140° F. |
| O2_Recovery_State_Min_Water_Jacket_Temp | 100° F. |
| O2_Recovery_State_Esc_Value | 6.5% |
| Blower_Exercise_Interval_Time | 20 min. |
| Blower_Idle_Cat_Temp | 446° F. |
| Blower_Idle_Cat_Esc_Temp | 599° F. |
| Blower_Idle_Interval_Time | 40 min. |

The values of variables shown in Table 2 are exemplary. For example, the values shown in Table 2 may be appropriate for intelligent controllers 109 used with older, less efficient, bio-fuel burning devices. Variable values for newer, more efficient, devices may be derived empirically. Nevertheless, the intelligent controller 109 may be described as controlling one or more aspects of the bio-fuel fired device 100, such as the heater 154 and the damper 110, based on rules. Various considerations for setting operating parameters will now be discussed. These considerations may be used, for example, to set or vary the variable values listed in Table 2, state transitions, etc.

The oxygen sensor 164 below the catalyst 140 may be used to determine if sufficient oxygen is available for the catalyst 140 to combust particulate matter and harmful gases. The amount of oxygen necessary may vary according by type of wood furnace and fuel used. Some acceptable pre-catalyst oxygen values lie between about 9% and about 13%. Acceptable ranges of pre-catalyst oxygen levels can also vary due to the stage of the combustion process. For example, the Pre-Heat State typically needs more oxygen that the Run State. These variables can also change based on the loading and re-loading of fuel. For example, when the fire box 108 is loaded full of fuel, less volume within the fire box 108 is available for air. Thus, a higher oxygen level may be necessary for efficient operation. If insufficient oxygen is detected, the intelligent controller 109 may open additional dampers 110 and/or turn on or pulse the blower 114 to add oxygen to the combustion process. Optionally or alternatively, the intelligent controller 109 may operate the air injector 178 and/or the draft inducer 174.

However, too much air flow volume or rate can be detrimental in several ways. Excess air velocity or flow rate (CFM) from the fan can push fly ash from the burning fuel into the catalyst 140, causing it to clog. High air flow rate can push heat out of the firebox 108 and the flue 172, thereby reducing efficiency of the device 100, which wastes fuel. To operate the catalyst 140 most effectively, smoke should pass over the catalyst 140 relatively slowly, i.e., there should be sufficient contact time ("residence time") between the smoke and the catalytic material. In addition, ambient air not consumed by the fire can cool the catalyst 140, thereby reducing the effectiveness of the catalyst.

On the other hand, if the damper 110 and/or the blower 114 is operating at maximum capacity, yet the detected oxygen level remains insufficient for a predetermined amount of time, such as about three minutes, the intelligent controller 109 may close the damper 110 and cease operation of the blower 114, at least for a predetermined amount time, on the assumption that the fire will recover or completely die out. In either case, while the damper 100 and blower 114 are not open or operating, smoke should not be emitted.

Automatic Adaptation to Ambient Conditions, State of Burning Device, Etc

Most current production wood furnaces are not designed for a post-combustion pollution control devices. Consequently, the damper 110, the blower 114 and/or the flue 134 may be inadequately sized to provide sufficient oxygen for both the fire in the fire box 108 and for the catalytic converter 140. In some cases, the blower 114 and/or the flue 134 may need to be replaced with larger units to provide sufficient oxygen. The pressure sensor 168 may be used to measure back pressure in the bio-fuel heater. Excess back pressure may cause creosote to be pushed out of dampers and fans, resulting in performance and maintenance issues with the heater over time. In addition, a buildup of volatile gases may cause an explosion. If the intelligent controller 109 detects excess pressure, which may be caused by such a buildup of volatile gas, the intelligent controller 109 may open the damper 110 and operate the blower 114 to combust or expel the gases.

Rated specifications for dampers, blowers, flue pipes, etc. are not always accurate. In addition, in many cases, these ratings should be reduced as a result of installation nonidealities. For example, protective housings placed over dampers or blowers may reduce their effective air handling capacities. However, often these adjustments are not made, and resulting systems are actually under-configured. Furthermore, over time, the damper 110 and blower 114 may become less efficient, such as due to wear and tear or buildups of viscous lubricants that inhibit free movement of shafts, etc. In addition, over time, inside walls of the flue 134 and the stack 172 may become coated with residue, thereby reducing their effective cross-sectional area and gas handling capabilities. Furthermore, over time the fire box 108, its door and other components may develop air leaks. For example, gaskets around the fire box door may become compressed or worn, causing the device to become less air tight.

Thus, although a system may be thought to be well designed or well-balanced when first installed, optimum operating parameters may never have been met or may change over time. The intelligent controller 109 senses various temperatures, etc., thus the intelligent controller 109 ascertains information about the system in its current (possibly compromised) state, and the intelligent controller 109 controls the dampers 110, blowers 114, etc. so as to achieve better results (cleaner and more efficient operation) than a system that is not automatically monitored and controlled. In other words, the intelligent controller 109 adjusts operation of the system as the system ages or in response to the installation of replacement parts or other maintenance performed on the system.

The door open sensor 189 enables the intelligent controller 109 to start a timer, and if the door remains open longer than a predetermined amount of time or the water jacket 118 temperature or the stack temperature 176 falls below a predetermined value, to sound an alarm, inasmuch as an open door can pose a safety problem, and extended door opening can decrease burner efficiency or cause the fire to rage.

The temperature sensor 176 at the top of the flue 172 may be used to monitor the temperature of gases leaving the stack 172 to insure moisture can escape. Biomass fuel typically includes some moisture, usually about 5-30%, which can become trapped in the wood furnace. More efficient wood furnaces, such as units that employ gasification technology, typically produce lower temperature exhaust than less efficient units. If the exhaust gas has a temperature less than the boiling point of water at the ambient barometric pressure and relative humidity, the water can condense in the flue and run back down into the fire box and cause rust and other problems. As noted, the intelligent controller 109 may sense the ambient conditions using sensors 181-184. Alternatively, the intelligent controller 109 may assume some predetermined ambient conditions exist. If the intelligent controller 109 detects a stack-top temperature less than necessary, such as less than about 213° F., to drive out moisture, the intelligent controller 109 may open the damper 110, activate the blower 114, activate the draft inducer 174, activate the heater 154 or adjust other parameters to increase the intensity of the fire and, thereby, increase the exhaust exit temperature. Low stack temperature may also be used by the intelligent controller 109 to detect a low-fuel or out-of-fuel condition and notify a user or fuel supplier, as discussed herein.

Pulsing

As noted, in wood gas generators (gasification units), bio-fuel is heated in one chamber to release volatile gases, and the gases flow into a subsequent chamber where they burn. If such a unit is not called upon to generate heat for an extended period of time, such as several hours, the volatile gas can build up within the unit and potentially cause an explosion. In some embodiments, the intelligent controller 109 "pulses" the bio-fuel heater to prevent such a buildup of gas. That is, during an extended period during which the bio-fuel heater is otherwise idle, the damper 110 is opened and, optionally, the blower 114 is operated for about two minutes every about half hour. Each such pulse refreshes the fire and combusts or expels the excess volatile gas.

We discovered that pulsing is also beneficial in non-gasification units. For example, pulsing during what would otherwise be an idle period keeps the fire going and hot, whereas otherwise the fire is likely to smoke heavily and/or go out. Some bio-fuel fired units are called upon to generate heat only infrequently. Some bio-fuel fired units operate for relatively short periods of time, such as about an hour, when called upon to generate heat, and then the units sit largely idle for relatively long periods of time, such as four, six and sometimes ten hours. Starting up a conventional burner after such a long idle period would generate considerable smoke. However, pulsing such a unit prevents or reduces smoke generation.

We have found pulsing non-gasification units for about one minute about every hour, even in the absence of (and particularly in the absence of) calls for heat, refreshes the fire and keeps it hot. We discovered that pulsing consumes little fuel, yet pulsing keeps the fire hot enough to prevent smoking and keeps the catalytic converter 140 warm enough so the catalytic converter 140 can be brought to operating temperature by the heater 154 quickly (if it is even necessary to do so), thereby saving electricity. Furthermore, the device 100 can be brought up to an operating temperature and begin generating hot water, etc. quickly.

Although periodic pulsing provides the above-listed advantages, we have found that pulsing based on stack temperature, rather than based on time, provides additional advantages, as described below. A pulse should be initiated when the stack or other measured temperature falls to a predetermined value. We have found desirable temperatures at which pulses should be triggered depend on factors related to the unit being pulsed. Modern, tight, efficient units normally operate at lower temperatures than older, leaky, less efficient units. We found that triggering a pulse at about 200° F. in a relatively tight unit is desirable, whereas higher temperatures, about 375-400° F., are appropriate for less efficient units. Although hard-coded temperature values for triggering pulses may be used, an automatic method for determining the trigger temperature is described below.

Figure 5:
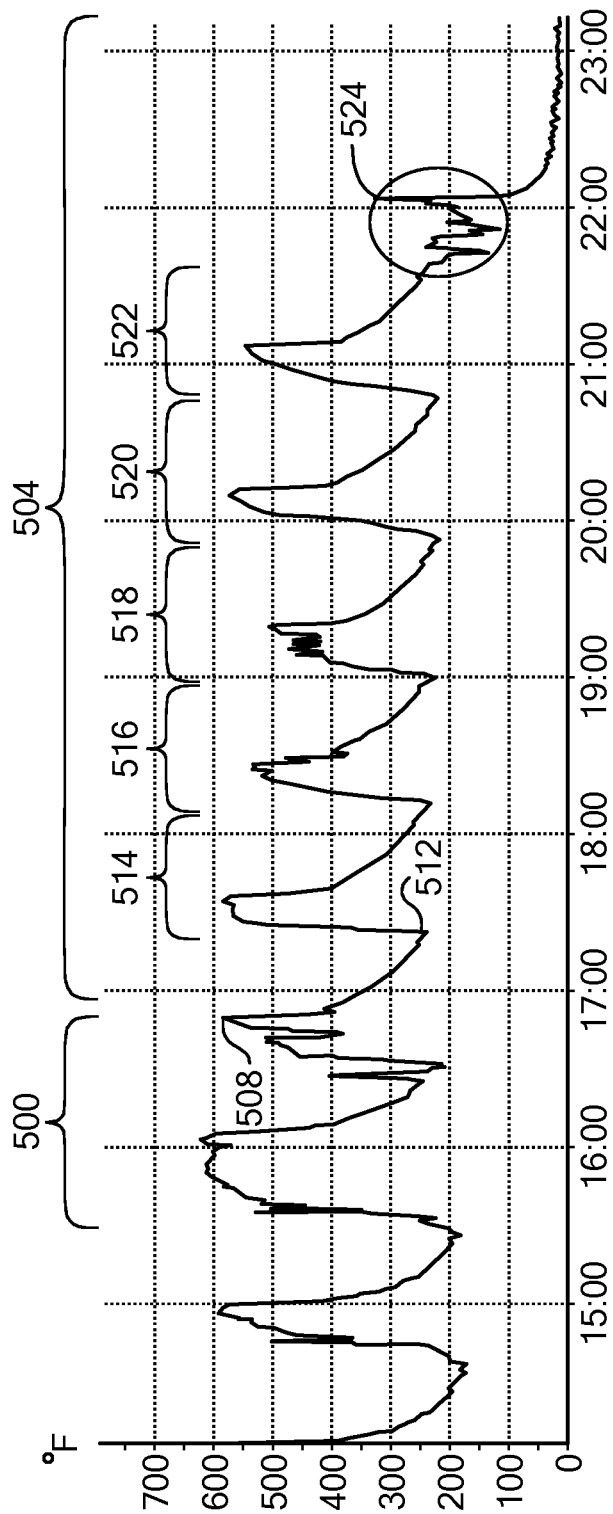
FIG. 5 is a graph showing hypothetical temperature data from a bio-fuel fired boiler controlled by the intelligent bio-fuel controller of FIG. 1.

FIG. 5 is a hypothetical graph of temperature detected by the sensor 148 above the catalytic converter 140. The graph of FIG. 5 is based on actual experiments we conducted on bio-fuel fired burners equipped with embodiments of the intelligent controller 109. We have conducted many experiments with a large number of bio-fuel fired units, and we found this graph to be representative, although the pulse trigger temperature may vary, as discussed above. During time period 500, the bio-fuel fired device under test was called on to generate heat at various times, as evident from the irregular fluctuations in temperature. However, during time period 504, the device was idle, and operation and some advantages of pulsing can be seen.

At 508 the last call for heat ended, and the damper 110 was closed and the blower 114 ceased operation. As a result, the fire dwindled, and the temperature decreased. At 512, once the temperature fell below a low temperature limit, the intelligent controller 109 initiated a pulse, which refreshed the fire and caused the temperature to increase. The temperature eventually decreased later in the interval 514. This process was repeated for pulse intervals 516 to 522. It should be noted that all the pulse intervals 514-522 are not necessarily the same width, because pulse initiation is triggered by temperature, not by the passage of time. Eventually, the fuel supply became exhausted and, despite several pulses in the portion of the graph indicated at 524, the fire died.

We found that, for a given combination of bio-fuel burning device and fuel, the temperature of an idle fire gradually declines to a characteristic value, and then quickly declines and then the fire goes out. At and above the characteristic temperature, the fire generates relatively little smoke, and it is relatively easy to increase the intensity of the fire by opening the damper 110 to introduce air. However, below the characteristic temperature, the fire becomes smoky and difficult to revive. The intelligent controller 109 may be configured to monitor temperature over time and estimate this characteristic temperature, i.e., the temperature at which the slope of the temperature curve changes. This characteristic temperature is preferably used as the trigger for pulsing. Absent such an automatically determined trigger temperature, 200° F. may be used for a relatively tight unit, whereas higher temperatures, such as about 375-400° F., may be used less efficient units.

As noted, we prefer to initiate a pulse based on temperature, rather than based on the passage of time. Nevertheless, we discovered that with adequate fuel for the fire box 108 (FIG. 1), the pulses tend to occur at fairly regular time intervals, as can be seen for pulses 514-522. The intelligent controller 109 may be configured to record the times of the pulses and calculate a typical pulse interval. Although this typical pulse interval may vary, based on several factors, such as stove-specific factors, fuel type and ambient temperature, the average pulse interval changes slowly, if at all, for a given set of stove factor while the fuel supply is adequate. However, when the fuel supply is low, we found that the temperature-triggered pulses occur more frequently, as can be seen in the portion 524 of the graph in FIG. 5. Thus, the intelligent controller 109 may be configured to estimate the typical pulse interval and revise this estimate over time and then detect a low-fuel condition by detecting pulsing more frequently than the estimated typical pulse interval for the bio-fuel fired device.

We also discovered that, when the fuel supply is low, pulsing may not restore the temperature to the target value. This effect can be seen in the portion 524 of the graph of FIG. 5. Thus, if pulsing fails to restore the desired temperature, the intelligent controller 109 may conclude that the fuel supply is low. Although stack temperature may be used to detect when to initiate a pulse and whether the pulse succeeds in restoring the desired temperature, with more efficient units, the stack temperature is lower, and varies less, than with less efficient units. Furthermore, flue temperatures above the catalyst may be depressed by precipitation, such as rain or snow, entering the flue. Therefore, measuring flue temperature below the catalyst may be more accurate, because the temperature below the catalyst has not been artificially raised by the combustion of smoke by the catalyst.

Some embodiments include a wired or wireless weather data receiver. The intelligent controller 109 may use weather data in its calculations. For example, if outside temperature is predicted to increase or to be mild, the controller 109 may underfeed fuel to the furnace, as compared to the amount of fuel the controller 109 would otherwise feed, based on a current thermal demand. Conversely, if the outside temperature is predicted to decrease or to be cold, the controller 109 may overfeed fuel to the furnace, as compared to the amount of fuel the controller 109 would otherwise feed, based on a current thermal demand.

In some embodiments, the controller 109 receives temperature signals from a temperature sensor located in a place whose temperature is not detected by a thermostat that generates call-for-heat signals to the furnace. For example, a temperature sensor may be located in an unheated attic of a dwelling or outdoors of a warehouse. The controller 109 may use the temperature detected by such a sensor in its determination of a fuel feed rate, and optionally an air feed rate, for the furnace.

The intelligent controller 109 may decrease the pulse interval if it detects a high moisture content, such as more than about 20% water, in the flue gas. Such a high moisture content may indicate frozen or green wood is being burned, which requires more oxygen. Similarly, pulsing frequency may be increased after a fuel reload (such as detected by a door-open event, sudden drop of more than about 50° F. in stack temperature or high flue flow rate) or a cold start. High-frequency pulsing may involve pulsing for about two minutes every about 15 minutes.

Air Control

As noted, controlling the amount of oxygen available for the fire in the fire box 108 and for the catalyst 140 are important to operating the device 100 efficiently and cleanly. For example, after a large load of fuel has burned, a condition known as "bridging" often occurs, in which low-lying fuel is consumed by the fire, leaving an arc of coal that bridges the volume previously occupied by the now-consumed fuel. Collapse of the bridge typically consumes a large quantity of oxygen as the fire momentarily flares. After the oxygen has been consumed, the remaining coals often generate a large quantity of smoke. When the intelligent controller 109 detects a bridging event, such as by a signature change in temperature, a sudden increase in smoke or a sudden decrease in excess oxygen, the controller shuts the damper 110 and turns off the blower 114 for about ten to 15 minutes. It is counter-intuitive to shut the damper 110 in response to such an increase in temperature. After the about ten to 15-minute period during which the fire re-establishes itself, the controller 109 gradually opens the damper 110 to introduce progressively larger amounts of air. In some embodiments, the damper 110 is left open for at least about 15 minutes, even if the excess oxygen level is below the predetermined value, such as about 3-4%. Pulsing may also be used to recover from a bridging event.

Automatic Notification of Out-of-Fuel Condition

As noted, the intelligent controller 109 may be coupled to a wireless transmitter 192. Using this transmitter 192, the intelligent controller 109 may notify a user of a low-fuel condition, such as by sending an e-mail message or a text message or by placing a telephone call to the user's mobile communication device 196 or to another device. Similarly, the intelligent controller 109 may log data about operation of the bio-fuel fired unit to a remote data recorder 194, such as the ClearStak Mobile Application.

In some situations, such as a bio-fuel fired unit that is largely unattended or in a remote location, fuel may be automatically fed to the bio-fuel fired unit, such as by an auger. However, the fuel supply to the auger is limited. Once the auger's supply is depleted, the intelligent controller 109 may detect the low-fuel condition, as described above, and notify a fuel supplier to deliver another load of fuel.

Optionally or in addition, the intelligent controller 109 may be coupled to a wireless receiver or transceiver, also designated 192. In this case, the intelligent controller 109 may receive messages, such as queries or instructions, from a user, such as in the form of e-mail or text messages, via a dedicated mobile telephone application or web site served by the intelligent controller 109 or by the remote data recorder 194. In such a context, a user may query the intelligent controller 109 to ascertain operating conditions, such as amount of heat generated over time, an estimate of the amount of fuel consumed to generate this heat or an estimate of the amount of fuel remaining. The user may command the intelligent controller 109 to change operating parameters, such as preferentially generating domestic hot water rather than space heating, or visa-versa. Optionally or alternatively, the intelligent controller 109 may "push" information about operating parameters, such as water temperature, and/or events, such as low water, to a remote application.

Modes of Operation

In one mode of operation, referred to herein as "master," the intelligent controller 109 operates essentially continuously. In master mode, the intelligent controller 109 is preferably powered continuously. Furthermore, calls for heat, such as from the aquastat 128 that indicates the water jacket 118 temperature has fallen below its set point. In response, the intelligent controller 109 opens the damper 110 and/or operates the blower 114 to operate the bio-fuel fired device 100 and, thereby, heat the water in the water jacket 118. Similar operations may be triggered by thermostats in dwellings that are heated by the bio-fuel fired device 100, coffee bean roasting devices, etc.

In contrast to master mode, the intelligent controller 109 may be operated in "slave" mode. In slave mode, the intelligent controller 109 is preferably not powered continuously. Instead, the intelligent controller 109 is powered only while the bio-fuel fired device 100 is operating, that is, while the damper 110 is open and/or the blower 114 is operating. Thus, in some cases, the intelligent controller 109 may be connected to the power supply for the damper 110 or the blower 114, so that the intelligent controller 109 receives operating electrical power only when the damper 110 is open and/or the blower 114 operates. Thus, in slave mode, the intelligent controller 109 does not control the damper 110 or the blower 114. However, the intelligent controller 109 controls the catalyst heater 140, and it may control an air injector 178 and/or a draft inducer 174.

In slave mode, the intelligent controller 109 executes an initialization sequence each time it is powered up. Thus, in slave mode, timeout timers, such as Preheat_State_Max_Time (the amount of time after which the unit enters Lockout State if the temperature below the catalytic converter 140 fails to reach a predetermined value; see Table 2), are reset for each call for heat. Slave mode consumes less electric power than master mode and may increase service life of the intelligent controller 109. The operating mode may be selected by a jumper or a switch, such as mode switch 190 (FIG. 1).

As noted, various combinations of disclosed components may be used in various embodiments. In one embodiment, the intelligent controller 109 merely controls the heater 154 to maintain the catalytic converter 140 at least at its minimum operating temperature, regardless of whether the bio-fuel fired device 100 is operating or not. In other words, it does not matter if a fire is burning in the device 100. In some locations, electricity cost is low enough to justify keeping the catalyst at least at its minimum operating temperature, even if the device 100 is not used for hours or days. In some such embodiments, the minimum operating temperature of the catalyst 140 is set to about 599° F.

Other Embodiments

Although a catalyst-based pollution control device 138 is described herein, the intelligent controller 109 may be used advantageously with other types of pollution control devices. For example, some well-known pollution control devices include an electrostatic precipitator (ESP). Although an ESP does not benefit from a warm-up cycle, ESPs nevertheless consume electrical power when they operate. The disclosed intelligent controller 109 may be configured to control operation of an ESP. For example, the ESP may be powered on only when the damper 110 is open or when the intelligent controller 109 ascertains that smoke is being, or is likely to be, generated.

As the catalyst 140 combusts particulates and gases, heat can be generated ranging from about 700° F. to about 1,800° F. This heat is commonly lost up the stack. A liquid or air heat exchanger (not shown) installed after the catalyst 140 may be used to recover this heat and produce heated water or air for domestic or industrial purposes, such as space heating or generating electrical power.

As described above, the intelligent controller 109 may control a heater 154 for a catalytic converter 140 and/or one or more air handlers 110, 114, 174, 178, based on one or more measured quantities, such as stack temperature, catalyst temperature, oxygen level, etc. Although some combinations of measured quantities and controlled items are described, other combinations are contemplated. For example, the air handler 110, 114, 174, 178 may be operated in response to detecting smoke with the smoke detector 180 or in response to detecting insufficient flow with the gas flow detector 170. Control of the air handler 110, 114, 174, 178 need not be binary, i.e., on or off. A degree to which the air hander 110, 114, 174, 178 is operated, such as a degree to which the damper 110 is opened or the speed of the blower 114, may be adjusted up or down, based on measured the measured quantities. Similarly, operation of the heater 154 may be based on measured quantities other than, or in addition to, the temperature of the catalyst 140.

Some embodiments of the intelligent controller 109 have been described as being configured to automatically learn about a bio-fuel fired device by recording measured parameters over time and performing calculations on the measured parameters and to use the learned information to operate or adjust operation of the device. Although this learning was described in the context of pulsing, the intelligent controller 109 may be configured to automatically respond to other aspects of the device's operation. For example, hard wood typically burns hotter than soft wood, by volume. Thus, the intelligent controller 109 may be configured to adjust its parameters, such as the temperature at which pulsing is initiated, based on the typical burn characteristics measured recently by the controller.

Several models of operation of the bio-fuel fired device 100 may be defined, such as burning dried timber, burning wood pellets, burning branches, burning green wood, burning wood that includes significant bark (which tends to generate considerable particulate matter), burning wood that does not include bark, and the like. The intelligent controller 109 may be configured to make measurements and estimate which of several models most closely approximate the measured conditions, and the controller may set or modify parameters, such as the variables listed in Table 2, according to the model. The intelligent controller 109 may dynamically revise the model selection, such as over time. For example, after bark has burned off, the remaining wood may burn according to a different model.

While specific values chosen for some embodiments are recited, it is to be understood that, within the scope of the invention, values of all of parameters may vary over wide ranges to suit different applications.

As used herein, the term "call for heat" or "heat call" means a signal indicating a request to generate heat by the subject bio-fuel fired device. Such as signal may be generated by, or derived from, a sensor, another controller or a remote control. Exemplary sensors include an aquastat thermally coupled to the water jacket 118, a thermostat thermally coupled to the bio-fuel fired device 100 or something the device 100 directly or indirectly heats, such as a water tank, living space or other space. An exemplary remote control includes a mobile telephone, an application program being executed by the mobile telephone or a web page served by the intelligent controller 109 or the remote data recorder 194 or a browser displaying the web page.

An intelligently-controlled catalytic converter has been described as including a processor controlled by instructions stored in a memory. The memory may be random access memory (RAM), read-only memory (ROM), flash memory or any other memory, or combination thereof, suitable for storing control software or other instructions and data. The intelligent controller can also be accessed through a wireless connection to monitor, report and manage functions. Some of the functions performed by the intelligently-controlled catalytic converter have been described with reference to flowcharts and/or block diagrams.

Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of an intelligently-controlled catalytic converter have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiments.

What is claimed is:

1. A controller system for a biofuel-fired furnace, the system comprising:

a fuel feed controller connectable to a motorized fuel feed device of the biofuel furnace and configured to generate first signals for controlling operation of the fuel feed device;

a clinker agitator controller connectable to a motorized clinker agitator of the biofuel furnace and configured to generate signals for controlling operation of the clinker agitator;

a demand for heat calculator connectable to a sensor coupled to the biofuel furnace, so as to repeatedly receive signals from the sensor, the demand for heat calculator being configured to repeatedly calculate, based at least in part on the signals from the sensor, a demand for heat; and a heat production adjuster coupled to the demand for heat calculator and to the clinker agitator controller, the heat production adjuster being configured to:
repeatedly monitor the demand for heat;
repeatedly recalculate a fuel feed rate for the fuel feed device to deliver fuel to the biofuel furnace;
repeatedly recalculate times at which to operate the clinker agitator;
cause the clinker agitator controller to operate the clinker agitator, according to the recalculated times; and
cause the fuel feed controller to operate the fuel feed device according to a most recently recalculated fuel feed rate.

2. A system according to claim 1, wherein:
the heat demand calculator is further configured to repeatedly calculate a rate of change of the amount of heat being extracted from a heat-transfer medium flowing from the biofuel furnace; and
the heat production adjuster is further configured to repeatedly recalculate the fuel feed rate, based at least in part on a most recently recalculated rate of change of the amount of heat being extracted from the heat-transfer medium.

3. A system according to claim 1, wherein the sensor comprises a temperature sensor.

4. A system according to claim 1, further comprising:
an ash removal controller connectable to a motorized ash removal device of the biofuel furnace and configured to generate signals for controlling operation of the ash removal device;
wherein the heat production adjuster is coupled to the ash removal controller and is further configured to repeatedly recalculate an ash removal rate for the ash removal device to remove ash from the biofuel furnace and cause the ash removal controller to operate the ash removal device according to a most recently recalculated ash removal rate.

5. A system according to claim 4, wherein the heat production adjuster is further configured to repeatedly recalculate the ash removal rate, such that a ratio of the ash removal rate to the fuel feed rate remains within 1% of a constant value.

6. A system according to claim 5, wherein the heat production adjuster is further configured to repeatedly recalculate the ash removal rate, such that operation of the ash removal device lags behind operation of the fuel feed delivery device by a predetermined amount of time.

7. A system according to claim 1, further comprising:
an oxygen level calculator connectable to an oxygen sensor coupled to the biofuel furnace, so as to repeatedly receive signals from the oxygen sensor, the oxygen level calculator being configured to repeatedly calculate, based on the signals from the oxygen sensor, a current oxygen level within the biofuel furnace; wherein:

the heat production adjuster is coupled to the oxygen level calculator and is configured to:
repeatedly monitor the oxygen level within the biofuel furnace; and
repeatedly recalculate the fuel feed rate, based at least in part on a current oxygen level.

8. A system according to claim 7, further comprising a supply air controller connectable to a supply air handler of the biofuel furnace and configured to generate signals for controlling operation of the supply air handler wherein the heat production adjuster is further configured to cause the fuel feed controller and the supply air controller to operate the fuel feed device and the supply air handler, respectively, so as to deliver air to the biofuel-fired furnace after ceasing delivery of fuel to the biofuel-fired furnace until the current oxygen level reaches a predetermined value.

9. A system according to claim 1, wherein the controller calculates or estimates an amount of built-up ash, based at least in part on one or both a rate and an amount of fuel that has been fed into the device.

10. A controller system for a biofuel-fired furnace, the system comprising:
an ash removal controller connectable to a motorized ash removal device of the biofuel furnace and configured to generate signals for controlling operation of the ash removal device;
a clinker agitator controller connectable to a motorized clinker agitator of the biofuel furnace and configured to generate signals for controlling operation of the clinker agitator;
a demand for heat calculator connectable to a sensor coupled to the biofuel furnace, so as to repeatedly receive signals from the sensor, the calculator being configured to repeatedly calculate a demand for heat, based at least in part on the signals from the sensor; and
a heat production adjuster coupled to the demand for heat calculator, to the ash removal controller and to the clinker agitator controller, the heat production adjuster being configured to:
repeatedly recalculate times at which to operate the clinker agitator;
repeatedly recalculate an ash removal rate for the ash removal device to remove ash from the biofuel furnace;
cause the ash removal controller to operate the ash removal device according to a most recently recalculated ash removal rate; and
cause the clinker agitator controller to operate the clinker agitator, according to the recalculated times.

11. A system according to claim 10, further comprising a fuel feed controller connectable to a motorized fuel feed device of the biofuel furnace and configured to generate signals for controlling operation of the fuel feed device; and wherein the heat production adjuster is further configured to repeatedly recalculate a fuel feed rate and to cause the fuel feed controller to operate the fuel feed device according to a most recently recalculated fuel feed rate.

12. A system according to claim 11, wherein the heat production adjuster is further configured to repeatedly recalculate the ash removal rate, such that a ratio of the ash removal rate to the fuel feed rate remains within 1% of a constant value.

13. A system according to claim 11, wherein the heat production adjuster is further configured to repeatedly recalculate the ash removal rate, such that operation of the ash removal device lags behind operation of the fuel feed delivery device by a predetermined amount of time.

14. A system according to claim 11, wherein the controller calculates or estimates an amount of built-up ash, based at least in part on one or both a rate and an amount of fuel that has been fed into the device.

15. A system according to claim 11, further comprising:
an oxygen level calculator connectable to an oxygen sensor coupled to the biofuel furnace, so as to repeatedly receive signals from the oxygen sensor, the oxygen level calculator being configured to repeatedly calculate, based on the signals from the oxygen sensor, a current oxygen level within the biofuel furnace; wherein:
the heat production adjuster is coupled to the oxygen level calculator and is configured to:
repeatedly monitor the oxygen level within the biofuel furnace; and
repeatedly recalculate the fuel feed rate, based at least in part on a current oxygen level.

16. A system according to claim 15, further comprising a supply air controller connectable to a supply air handler of the biofuel furnace and configured to generate signals for controlling operation of the supply air handler; and wherein the heat production adjuster is further configured to repeatedly recalculate an air supply rate and to cause the air supply controller to operate the supply air handler according to a most recently recalculated air supply rate.

17. A system according to claim 16, wherein the heat production adjuster is further configured to cause the fuel feed controller and the supply air controller to operate the fuel feed device and the supply air handler, respectively, so as to deliver air to the biofuel-fired furnace after ceasing delivery of fuel to the biofuel-fired furnace until the current oxygen level reaches a predetermined value.

18. A controller system for a biofuel-fired furnace, the system comprising:
a fuel feed controller connectable to a motorized fuel feed device of the biofuel furnace and configured to generate signals for controlling operation of the fuel feed device;
a clinker agitator controller connectable to a motorized clinker agitator of the biofuel furnace and configured to generate signals for controlling operation of the clinker agitator;
an oxygen level calculator connectable to an oxygen sensor coupled to the biofuel furnace, so as to repeatedly receive signals from the oxygen sensor, the oxygen level calculator being configured to repeatedly calculate, based on the signals from the oxygen sensor, a current oxygen level within the biofuel furnace;
a demand for heat calculator connectable to a sensor coupled to the biofuel furnace, so as to repeatedly receive signals from the sensor, the demand for heat calculator being configured to repeatedly calculate a demand for heat, based at least in part on the signals from the sensor; and
a heat production adjuster coupled to the demand for heat calculator, to the fuel feed controller, to the clinker agitator controller and to the oxygen level calculator, the heat production adjuster being configured to:
repeatedly recalculate times at which to operate the clinker agitator;
repeatedly recalculate a fuel feed rate for the fuel feed device to deliver fuel to the biofuel furnace, based at least in part on the demand for heat and the current oxygen level;

cause the fuel feed controller to operate the fuel feed device, according to a most recently recalculated fuel feed rate; and cause the clinker agitator controller to operate the clinker agitator, according to the recalculated times.

19. A system according to claim 18, further comprising a supply air controller connectable to a supply air handler of the biofuel furnace and configured to generate signals for controlling operation of the supply air handler; and wherein the heat production adjuster is further configured to repeatedly recalculate an air supply rate and to cause the air supply controller to operate the supply air handler according to a most recently recalculated air supply rate.

20. A system according to claim 19, wherein the heat production adjuster is further configured to repeatedly adjust the rates at which the fuel feed device and the supply air handler deliver the fuel and the air, respectively, to the biofuel furnace, so as to deliver the fuel and the air at a ratio within a predetermined range.

21. A system according to claim 19, wherein the heat production adjuster is configured to alter the fuel to air ratio, based at least in part on at least one of: moisture content of the fuel, geometry of the fuel and density of the fuel.

22. A system according to claim 19, wherein the heat production adjuster is configured to repeatedly recalculate the air supply rate, based at least in part on a most recently recalculated fuel feed rate.

23. A system according to claim 19, wherein the heat production adjuster is further configured to cause the fuel feed controller and the supply air controller to operate the fuel feed device and the supply air handler, respectively, so as to deliver air to the biofuel-fired furnace for a predetermined amount of time prior to beginning delivery of fuel to the biofuel-fired furnace.

24. A system according to claim 19, wherein the heat production adjuster is further configured to cause the fuel feed controller and the supply air controller to operate the fuel feed device and the supply air handler, respectively, so as to deliver air to the biofuel-fired furnace after ceasing delivery of fuel to the biofuel-fired furnace until the current oxygen level reaches a predetermined value.

25. A system according to claim 18, further comprising:
an ash removal controller connectable to a motorized ash removal device of the biofuel furnace and configured to generate signals for controlling operation of the ash removal device;
wherein the heat production adjuster is coupled to the ash removal controller and is further configured to repeatedly recalculate an ash removal rate for the ash removal device to remove ash from the biofuel furnace and cause the ash removal controller to operate the ash removal device according to a most recently recalculated ash removal rate.

26. A system according to claim 25, wherein the heat production adjuster is further configured to repeatedly recalculate the ash removal rate, such that a ratio of the ash removal rate to the fuel feed rate remains within 1% of a constant value.

27. A system according to claim 25, wherein the heat production adjuster is further configured to repeatedly recalculate the ash removal rate, such that operation of the ash removal device lags behind operation of the fuel feed delivery device by a predetermined amount of time.

* * * * *